US011234370B2

(12) United States Patent
Molenaar

(10) Patent No.: US 11,234,370 B2
(45) Date of Patent: Feb. 1, 2022

(54) APPARATUS FOR HARVESTING VEGETABLE CROPS

(71) Applicant: TUMOBA B.V., Barendrecht (NL)

(72) Inventor: Hendrik Willem Molenaar, Barendrecht (NL)

(73) Assignee: TUMOBA B.V., Barendrecht (NL)

( * ) Notice: Subject to any disclaimer, the term of this patent is extended or adjusted under 35 U.S.C. 154(b) by 697 days.

(21) Appl. No.: 16/075,309

(22) PCT Filed: Feb. 2, 2017

(86) PCT No.: PCT/NL2017/000002
§ 371 (c)(1),
(2) Date: Aug. 3, 2018

(87) PCT Pub. No.: WO2017/135809
PCT Pub. Date: Aug. 10, 2017

(65) Prior Publication Data
US 2019/0053430 A1    Feb. 21, 2019

(30) Foreign Application Priority Data

Feb. 3, 2016 (NL) ........................... 1041709

(51) Int. Cl.
*A01D 45/26* (2006.01)

(52) U.S. Cl.
CPC .................. *A01D 45/26* (2013.01)

(58) Field of Classification Search
CPC .... A01D 45/26; A01D 45/263; A01D 45/266; A01D 45/00
See application file for complete search history.

(56) References Cited

U.S. PATENT DOCUMENTS

| 2,228,447 A | * | 1/1941 | Evelev | A01D 45/26 171/44 |
| 3,380,234 A | * | 4/1968 | Garrett | A01D 45/263 56/327.1 |
| 3,548,950 A | * | 12/1970 | Phelan | A01D 45/00 171/39 |

(Continued)

FOREIGN PATENT DOCUMENTS

| EP | 0 502 789 | 9/1992 |
| EP | 1 894 464 | 3/2008 |

(Continued)

OTHER PUBLICATIONS

International Search Report, PCT/NL2017/000002, dated Jul. 7, 2017.
Netherlands Search Report, 2019532 dated Mar. 6, 2018.

*Primary Examiner* — Thomas B Will
*Assistant Examiner* — Joan D Misa
(74) *Attorney, Agent, or Firm* — Nixon & Vanderhye

(57) ABSTRACT

Disclosed is a harvesting device for harvesting vegetable crops from the ground, which vegetable crops have a stem and a crown supported by the stem and leaves attached to the stem, said device comprising a frame, a first drive for moving the frame onward over the ground, a cutter for severing the stem, a second drive for the cutter, a stripper for stripping the leaves from the stem, and a third drive for moving the stripper vertically along the stem for in the stripper's strip position stripping the leaves from the stem.

20 Claims, 15 Drawing Sheets

(56) References Cited

U.S. PATENT DOCUMENTS

| | | | | |
|---|---|---|---|---|
| 5,560,190 | A * | 10/1996 | Ottaway | A01D 45/263 56/327.1 |
| 6,036,989 | A * | 3/2000 | Ellis | A23N 15/003 426/481 |
| 6,378,281 | B1 * | 4/2002 | Ottaway | A01D 45/263 56/327.1 |
| 6,622,467 | B1 * | 9/2003 | Ottaway | A01D 45/263 56/327.1 |
| 7,395,653 | B2 * | 7/2008 | de Groot | A23N 15/003 426/484 |
| 8,136,335 | B2 * | 3/2012 | Dobson | A01D 45/26 56/327.1 |
| 8,272,200 | B1 | 9/2012 | Ottaway | |
| 10,238,031 | B2 * | 3/2019 | D'Arrigo | A01D 46/30 |
| 10,542,671 | B2 * | 1/2020 | D'Arrigo | A01D 45/263 |
| 10,542,672 | B2 * | 1/2020 | D'Arrigo | A01D 46/30 |
| 2007/0095041 | A1 | 5/2007 | De Groot et al. | |
| 2009/0165433 | A1 | 7/2009 | Jauncey et al. | |

FOREIGN PATENT DOCUMENTS

| | | | |
|---|---|---|---|
| EP | 2 289 304 | 3/2011 | |
| JP | 06-178608 | 6/1994 | |
| JP | 07-8075 | 1/1995 | |
| SU | 897153 A2 * | 1/1982 | A01D 45/26 |

* cited by examiner

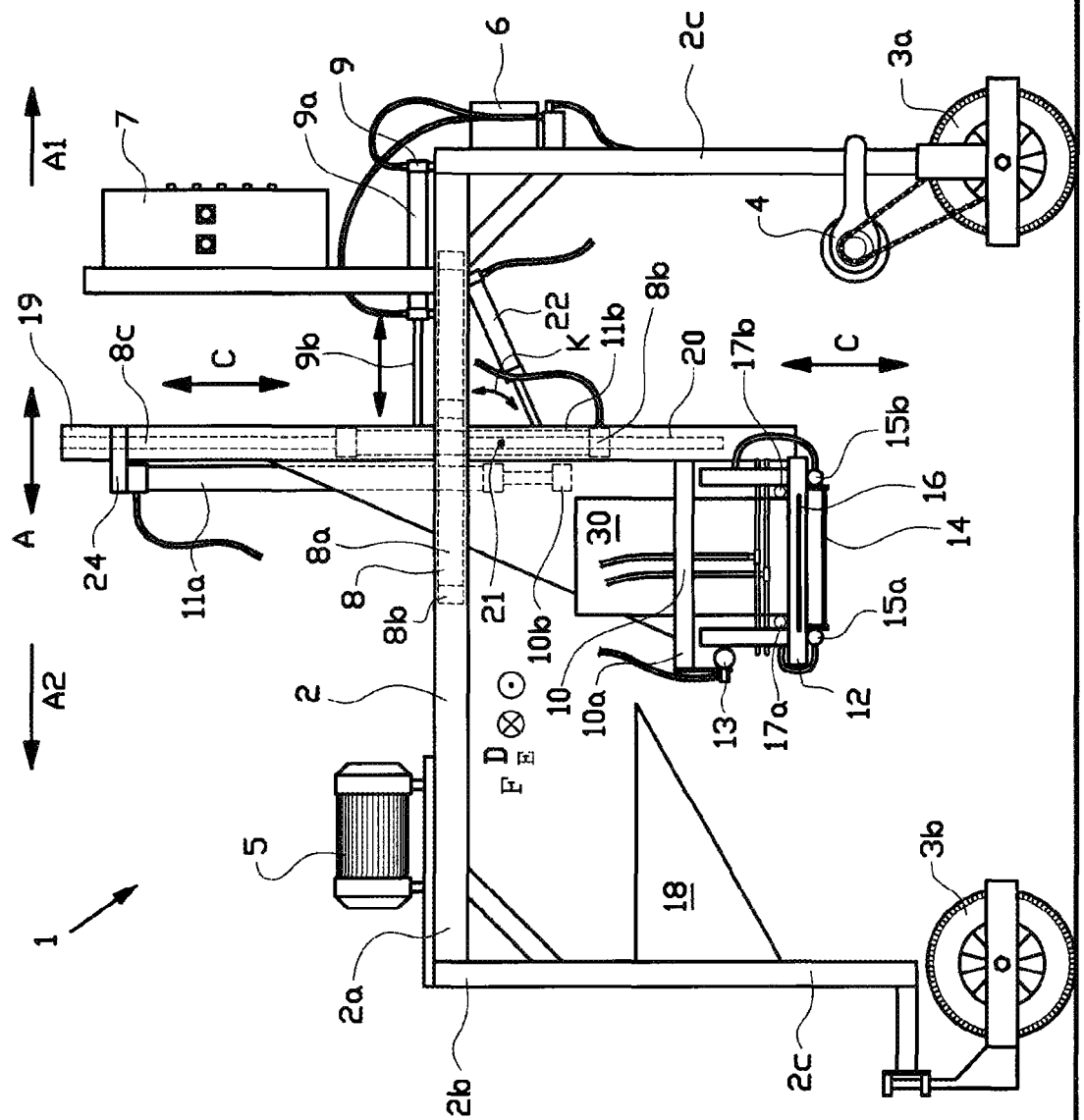

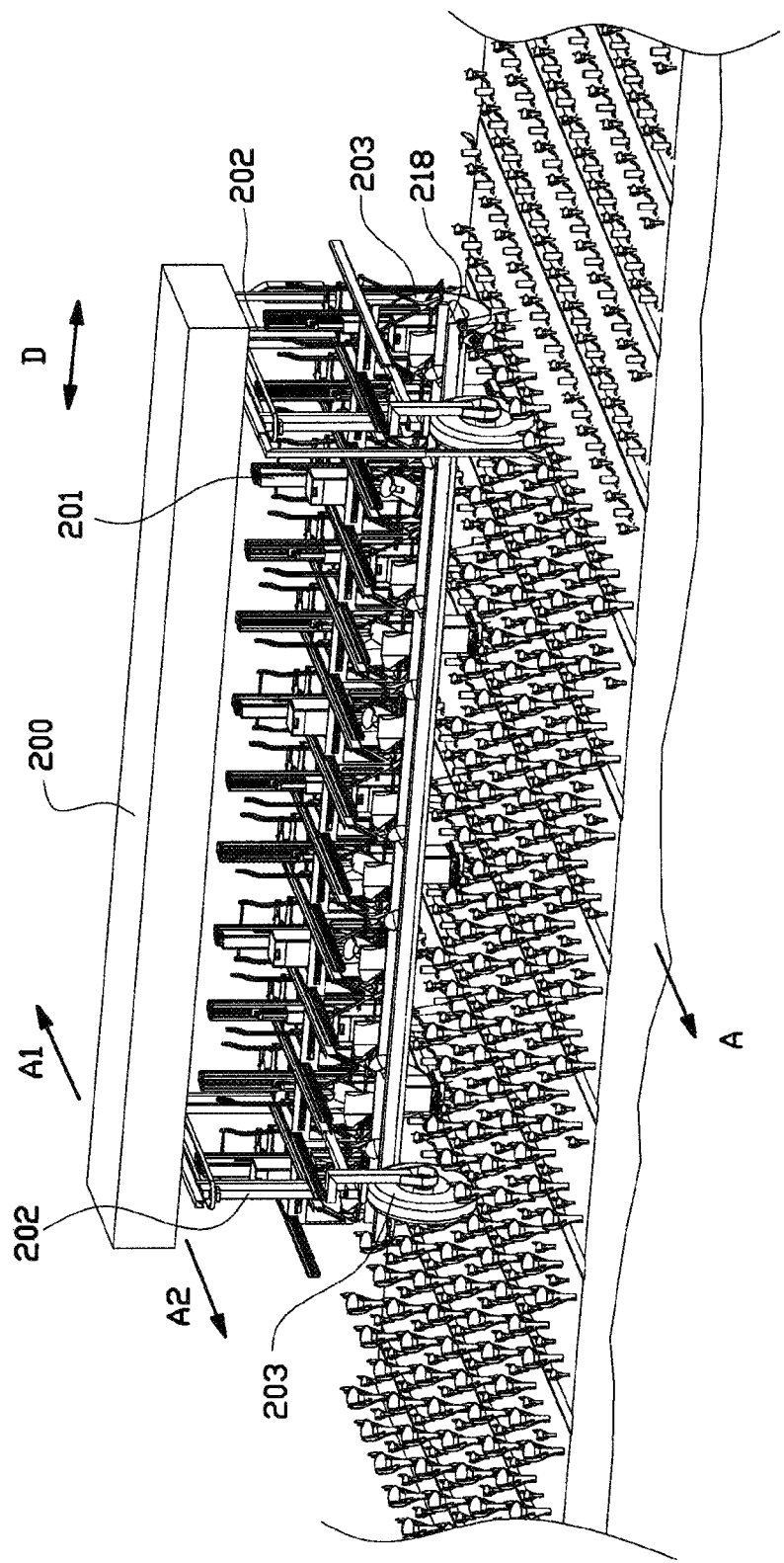

APPARATUS FOR HARVESTING VEGETABLE CROPS

BACKGROUND OF THE INVENTION

The invention relates to a device for harvesting vegetable crops from the ground, which vegetable crops have a stem and a crown supported by the stem, in particular having leaves attached to the stem. An example of such a vegetable crop is broccoli. Other examples are types of cabbages. The invention further relates to a method for harvesting such vegetable crops from the ground.

It is known to harvest broccoli from the ground (see European patent 1.894.464) by means of a harvesting machine riding over the land, which machine is provided with a double conveyor belt extending on either side of a vegetable plant to be cut off and which conveyor belts at their entrance are provided with a blade for severing the stem. The two conveyor belts clamp the severed upper part in between them while conveying it according to a U-shaped path situated in the vertical plane to a leave cutter, a stem shortener and a discharge/receptacle. The leave cutter comprises two circular blades that are operative in two horizontal planes that are situated close to each other. The arrangement is rather complex and failure-prone. The leaves that are still attached to the stem are a possible source of malfunctioning up until arriving at the leave cutter. The leaves cut off by the leave cutter are discharged, for instance by a blower, but prior to being discharged they are also a possible source of malfunctioning.

Another known harvesting machine, see US 2009/0165433, comprises a series of double conveyor belts that each have a blade positioned at their entry opening. Both conveyor belts extend straight upwardly inclined and pass the severed upper parts to circular blades for separating the crowns from the severed upper parts from the stems. The leaves cut off in the process, fall on the ground or are blown away. The crowns separated from the stems are discharged on a belt, wherein any foliage that was taken along nonetheless, is removed so that only the crowns are left. In this case as well the leaves form a potential source of malfunctioning.

Another harvesting machine (European patent 0.502.789) has straight double conveyors that extend horizontally or upwardly inclined and a number of means for removing the leaves. In one embodiment, a blower that is active in downward direction for bending the leaves down, is positioned downstream of the blade for severing the stem and immediately downstream of two rotating swerving elements by which the downwardly bent leaves are separated from the stem. Before the severed upper parts are being presented to a second blade for separating the remaining stem from the crown, the remaining leaves are bent downwards by two permanent guiding rods. In another embodiment, the blower is positioned in process direction upstream of the conveyor belts.

Another type of harvesting machine is known from EP 2.289.304, wherein after severing the stem, the upper parts are being transported to a discharge by means of a tunnel-shaped conveyor built up from a circumferentially driven series of pairs of fingers that are placed close to each other. The fingers of each pair can be moved relative to each other between an open position and a closed position, according to a hinge axis that is in one vertical plane with the direction of movement of the harvesting machine. When closing the fingers the leaves of the plant are urged downwards, as a result of which the crown can be properly engaged by the fingers that have subsequently been closed. The stem is then severed immediately below the fingers, closely below the crown. On the discharge side, leaves that are passed along in the conveyor, are blown away by a blower once the fingers have been opened again.

SUMMARY OF THE INVENTION

It is an object of the invention to provide a harvesting machine and/or a method of the type mentioned in the preamble, with which the presence of leaves in the machine will be prevented to a large extent.

It is an object of the invention to provide a harvesting machine and/or a method of the type mentioned in the preamble, which to a largely reduced extent is prone to malfunctioning caused by the vegetable plant leaves.

It is an object of the invention to provide a harvesting machine and/or a method of the type mentioned in the preamble, with which vegetable plants can reliably be harvested.

It is an object of the invention to provide a harvesting machine and/or a method of the type mentioned in the preamble, with which vegetable plants can be harvested including crown and a stem that is at least substantially free from leaves.

It is an object of the invention to provide a harvesting machine and/or a method of the type mentioned in the preamble, with which harvesting can be carried out efficiently.

It is an object of the invention to provide a harvesting machine of the type mentioned in the preamble, which can be compact in direction of operation.

For achieving at least one of these objects, the invention, according to one aspect, provides a device for harvesting vegetable crops from the ground, which vegetable crops have a stem and a crown supported by the stem and leaves attached to the stem, said device comprising a frame, a first drive for moving the frame onward over the ground, a cutter for severing the stem, a second drive for the cutter, a stripper for stripping the leaves from the stem, and a third drive for moving the stripper vertically along the stem for in the stripper's strip position stripping the leaves from the stem.

In that way, the leaves can be removed from the stem while the vegetable plant in question is still in the ground. Consequently, the stem can be stationary to a large extent, without a mechanical aid being required. Stripping the leaves can be carried out reliably, in particular when the stripper strips during its movement in downward direction along the stem. The leaves remain outside of the machine and are hardly moved. Once severed, the severed upper parts are practically suitable/ready to be discharged. The harvesting machine can thus be simple and compact.

The stripper can comprise two or more stripper members, and a fourth drive for moving the stripper members towards each other and away from each other between a position that is free from the stem and a strip position in which they engage onto the leaves at least near the stem. In one embodiment, the stripper members in the strip position jointly extend around the stem.

In one embodiment, the fourth drive is configured for moving the stripper members towards each other and away from each other between a free position, in which the stripper members leave a passage for the crown free in between them, and the strip position. The stripper can then be moved from the top down over the crown and back up again, after stripping.

The stripper members can be reciprocally moved in a linear manner between the said two positions, in particular in a horizontal plane, by the fourth drive.

In a simple embodiment, the stripper comprises two stripper members that are disposed diametrically opposite each other.

The cutter can comprise one or more blades. The cutter can comprise a counterblade or an anvil.

In a first further development, the stripper also forms the cutter, as a result of which the number of parts can be kept within limits and the compactness can be enhanced. In the case of a stripper having two or more stripper members, one or more stripper members can form a blade. Preferably the (fourth) drive for the stripper members then coincides with the drive of the blade (second drive), for first moving the stripper members towards each other into the strip position and after stripping moving the blade for severing the stem, and back again.

In a second further development, the cutter is situated above the stripper. As a result, the cutter will always encounter a foliage-free stem surface, which enhances the cutting process.

In a further development, the device according to the invention comprises a lift and a lift drive for, once the upper part of the vegetable plant has been severed by the cutter, moving said severed upper part to a higher level, in particular in at least substantially vertical direction relative to the frame. As further treatments will not or hardly be necessary after severing, a treatment path will not be required thus resulting in a device that can be compact in horizontal sense. The lift takes the severed upper parts to a level where they can be collected and discharged.

In an efficient embodiment, the cutter itself forms a support that is part of the lift for the portion of the severed vegetable plant situated above the cutting surface.

The device can be provided with a receptacle/discharge for the severed upper part of the vegetable plant, and a transfer device for transferring the severed upper part of the vegetable plant from the lift to the receptacle/discharge. The receptacle can for instance be a tray. The discharge can for instance be a belt conveyor.

The transfer device can for instance be an ejector or pulling device pushing or pulling the severed upper part aside.

The transfer device can also be a guide for guiding the severed upper part of the vegetable plant to the discharge/receptacle. The guide can then form a sloping guidance surface, for instance form a (movable) flap. The second drive can be configured for moving the cutter to a position cancelling the support in which the severed upper part of the vegetable plant is released for a falling motion towards the guide for guidance by it to the receptacle/discharge. The cutter can then be returned to a starting position, ready to be lowered over the crown of a next plant. In case of the cutter and stripper coinciding, this also applies to the stripper.

In a compact embodiment, the guide can be moved between an inactive position, in which the cutter including support is given vertical free passage, and an active position, in which the severed upper part of the vegetable plant can be received from the support and is being guided to the receptacle/discharge, wherein the device further comprises a fifth drive for moving the guide between the inactive position and the active position.

The fifth drive can be positioned for directly driving the guide, the fifth drive can in particular be configured as a cylinder.

Alternatively, the cutter can be mechanically connected to the guide in such a manner that the position of the guide depends on the position of the cutter, and the lift drive indirectly forms the fifth drive for moving the guide from the inactive position to the active position and/or vice versa. Via said connection the position of the guide depends on the vertical position of the cutter. Due to the mechanical coupling, it is further ensured that the displacement paths of the cutter and the guide do not intersect at the same moment.

In a further development of the device according to the invention it comprises an orienting device for orienting the cutter and the stripper in the horizontal plane, relative to the crown, in particular its center.

For that purpose, the cutter and the stripper can be arranged on a first partial frame that is supported by the frame, which first partial frame can be moved relative to the frame in the X-direction by a sixth drive. The first partial frame can alternatively or additionally be moved relative to the frame in the Y-direction by a seventh drive.

The first partial frame can be moved relative to the frame in the Z-direction by an eighth drive, in order to vertically move the stripper and the cutter as a unity. In case the cutter functions as a lift, the upward return stroke of the stripper will then be efficiently combined with the (extra) operational stroke of the cutter, as a transport support for the severed upper part, in which case the eighth drive also forms the said lift drive.

Further distinction can be made in partial frames, in view of limiting the required power for the said movements in connection with orienting. For instance, the first partial frame can be supported by a second partial frame that is supported by the frame, wherein the seventh drive is operative between the first and the second partial frame. Further, the second partial frame can be supported by a third partial frame, wherein the sixth drive is operative between the third partial frame and the frame.

The eighth drive (the Z-direction) can be operative between the frame or the third partial frame on the one hand, and the second partial frame on the other hand. Alternatively, the eighth drive can be operative between the first and the second partial frame. In one embodiment, the seventh drive is operative between the second and the third partial frame.

In a compact, efficient embodiment the third drive is part of the eighth drive. The eighth drive can also form the lift drive.

Other divisions in partial frames and directions of mutual relative movement are possible. For instance, the first partial frame including cutter and stripper can be supported by a second partial frame and be moved up and down relative thereto by an eight drive, whereas the second partial frame is supported by a third partial frame and can be reciprocally moved relative thereto in the Y-direction by a seventh drive. The third partial frame can then be supported by the frame and be reciprocally moved relative to the frame in the X-direction by a sixth drive. In this alternative, the seventh drive need not be taken along in the vertical motion by the eighth drive.

Instead of an arrangement of the first partial frame in which it is moved along guides in the X- and Y- and optionally the Z-direction, in an alternative embodiment the cutter and the stripper can be arranged on a first partial frame that has been arranged at the outer end of a robotic arm, which is attached to the frame and which first partial frame can be moved by it in the X- and Y-directions, preferably in the X-, Y- and Z-directions. The robotic arm can be articulated and/or provided with one or more telescopic segments, for taking the outer end with first partial frame to the correct position.

In one embodiment, the first partial frame is attached to the outer end of the robotic arm and can be moved linearly and vertically up and down relative to the outer end by means of a ninth drive. Said ninth drive can then function as said third drive.

The orienting device can comprise a crown position determiner and can then be configured for in dependency on the data provided by the crown position determiner orienting the cutter and the stripper in the horizontal plane relative to the crown, that means in the X-direction and/or the Y-direction, in particular at least substantially centered relative to the crown.

The crown position determiner together with the stripper and the cutter can form a unit that can be moved in the horizontal plane, so that the stripper and the cutter as if of their own accord are taken to the correct position above the crown by the movements of the crown position determiner. Due to combining the crown position determiner with the stripper and cutter in one unit that can be moved in the X- and the Y-direction, the device can be compact in the horizontal plane. The device can furthermore easily be suitable for operation in both X-directions, so that when arriving at the end of a row of plants, the device is able to continue working in the next row without turning around, coming back again from said end. Such a device can be unmanned.

In the said embodiment with robotic arm, the unit of crown position determiner, cutter and stripper can be arranged at the outer end of the robotic arm.

The crown position determiner together with the stripper and the cutter can form a unit that can be moved in vertical direction.

In case of the above-mentioned partial frames, the crown position determiner can be attached to the assembly of first and second partial frame, preferably to the first partial frame. The movements in the X- and the Y-directions can take place by controlling either the said sixth and/or seventh drives, or the position of the outer end of the robotic arm in the horizontal plane.

The crown position determiner can comprise a camera. The camera can be situated above the stripper and cutter, in particular straight above it. The lens center line of the camera can be oriented vertically downwards. This does not only enhance the compactness, it also enhances the possibility of using the device in two subsequent (drive) directions without turning around.

In an independent embodiment, the camera is part of a vision system, which has a programmable control unit and which is incorporated in the orienting device, which vision system by means of suitable software, algorithm, is configured for by means of the camera image searching for the location and the center of the crown of the vegetable plant. By means of the programmable control unit, based on the current data from the camera, the position of the camera and thus the stripper and cutter is directed to a position that is indicative for the center of the crown, in particular when considered in a vertical projection on a horizontal plane. This may for instance be the center of a best-fit circumscribed circle of the crown or the surface center of gravity.

In a further embodiment, the vision system is configured for providing an indication for the girth of the vegetable plant crown, in particular considered in a vertical projection on a horizontal plane. The indication can be a one-dimensional measurement or an area measurement.

In the control unit of the vision system, said indication can be compared with a threshold value for the crown girth that has been pre-entered in the system. Said reference or threshold value (size, shape) can be adjusted, for instance to the type of plant to be harvested and/or the wanted size of the plants to be harvested. The threshold value can for instance be formed by a surface of a specific size. When the comparison in the control unit shows that the crown surface indicated by means of the camera in the vision system exceeds the surface of the threshold value, the control unit will activate the stripper/cutter and the plant will be harvested. If the threshold value is not made, the stripper/cutter are kept inactive and the plant in question will not be harvested.

The comparison can be made when the camera has arrived above the center of the crown, as described above.

Alternatively, it is also possible that the indication of the crown girth is generated earlier on, so that in case of too small a crown girth the process of searching for the center of the crown can be broken off. This is possible as after all several camera observations are successively being made during the passage over a vegetable plant.

The vision system can be configured for searching for and indicating the location (in particular the center) of the crown, and/or providing an indication of the crown girth using contrast measurements.

In one embodiment, the device according to the invention is provided with a sensor for detecting the distance to the crown of the vegetable plant, wherein the eighth drive (or the drive of the robotic arm) is operative in dependency on the detection by the sensor, controlled by a programmable control unit. The distance from sensor to cutter and stripper is a given. The crown depth (the dimension of the crown in vertical direction) of the crop to be harvested can for instance be determined on the basis of the crown girth indicated by means of the camera. A suitable relation (such as table) between crown girth and crown depth for the crop to be harvested, may have been entered into the control unit. Alternatively, the crown depth can be determined as an approximation of the average or as a maximum value for the crop to be harvested. Subtracting this (the determined crown depth) from the distance between sensor and stripper/cutter, results in an entered distance value sensor-crown that, once detected by the sensor during its downward motion will have the control unit deactivate the eighth drive to stop the downward motion. Depending on the way the eighth drive has been configured, a deceleration margin can be added to said value, for instance 5 cm. In that case the stripper will in general have arrived at the correct level just below the crown. The distance over which the stripper needs to be active in a further, downward stroke for the crop in question to be harvested, can also be entered into this control unit.

In a further development thereof, an intermediate distance value has been or can be entered into the control unit, which intermediate distance value is adjusted to an intermediate position in which the stripper is positioned at a relatively short distance above the crown. In said intermediate position the stripper can be held in a condition in which the stripper leaves a vertical passage free that suffices for the sensor measurement beam but which is smaller than the crown girth considered in a vertical projection on a horizontal plane. In such a position the stripper together with the bottom surface is able to abut optionally present covering leaves extending over the crown to the inside. If the stripper would be kept wide open for the purpose of the downward movement over the crown, such covering leaves could remain within the stripper passage and as a consequence remain outside of the scope of action of the stripper. By moving the stripper against those covering leaves and then prior to the next step of moving downwards around the crown, having the stripper move apart in horizontal direction, an outward force can be exerted on those covering leaves and they can subsequently be bent away to the outside by the stripper moving downwards.

According to a further aspect, the invention provides a device for harvesting vegetable crops from the ground, which vegetable crops have a stem and a crown supported by the stem and leaves attached to the stem, said device comprising a frame, a first drive for moving the frame onward over the ground, a cutter having at least one blade for severing the stem, a second drive for the cutter for moving the blade from an inactive position to a cutting position for severing the stem, and a further drive for vertically moving the cutter between a low position at severing level and a higher discharge position, wherein the blade forms a transportation support for the detached upper part situated above it once the stem has been severed, which transportation support with severed upper part supported by it, can be moved by the further drive to the higher discharge position for discharging the severed upper part to a discharge or receptacle. In that way, the cutter is also being utilized for moving the severed upper part upward to a location suitable for transfer to a discharge/receptacle. A horizontal movement of the transportation support itself relative to the frame is not required for the transfer to the discharge/receptacle, as a consequence of which the device can be compact.

The device can be provided with a receptacle/discharge for the severed upper part of the vegetable plant, and a transfer device for transferring the severed upper part of the vegetable plant from the lift to the receptacle/discharge. The receptacle can for instance be a tray. The discharge can for instance be a belt conveyor.

The transfer device can for instance be an ejector or pulling device pushing or pulling the severed upper part aside.

The transfer device can also be a guide for guiding the severed upper part of the vegetable plant to the discharge/receptacle. The guide can then form a sloping guidance surface, for instance form a (movable) flap. The second drive can be controlled for retaining the blade in the cutting position during the period as from completing severing the stem up to reaching the discharge position, and in said discharge position retracting the blade into the inactive position for discharging the severed upper part to the guide in a falling motion.

The cutter can then be returned to a starting position, ready to be lowered over the crown of a next plant. In case of the cutter and stripper coinciding, this also applies to the stripper.

In a compact embodiment, the guide can be moved between an inactive position, in which the cutter including support is given vertical free passage, and an active position, in which the severed upper part of the vegetable plant can be received from the transportation support and is being guided to the receptacle/discharge, wherein the device further comprises a guide drive for moving the guide from the inactive position to the active position and/or vice versa.

The cutter can be mechanically connected to the guide in such a manner that the position of the guide depends on the position of the cutter, and the further drive indirectly forms a guide drive for moving the guide from the inactive position to the active position and/or vice versa.

Alternatively, a guide drive may have been provided for directly driving the guide for moving the guide between the inactive position and the active position, the guide drive in particular being configured as a cylinder.

The guide can be pre-biassed towards the inactive position and/or towards the active position.

The device may furthermore have been provided with the stripper discussed above and one or more other aspects that have already been discussed.

The second, third, fourth, fifth, sixth, seventh, eighth and ninth drives discussed above can comprise fluid cylinders. Other kinds of drives can also be suitable, at the expert's discretion. They can all be controlled by a central control unit on the device, optionally in dependency on said sensor and/or crown position determiner and/or the driving speed of the device. The said control units of the vision system and that of the sensor can form one operative unity with the central control unit. In the control unit, the reference values can be entered on the basis of which the drive can be controlled.

According to a further aspect, the invention provides a device for harvesting vegetable crops from the ground, which vegetable crops have a stem and a crown supported by the stem, said device comprising a frame, a first drive for moving the frame onward over the ground, a cutter for severing the stem, and a crown position determiner having a vision system including a camera and a programmable control unit, wherein the cutter and the camera are part of an orienting and cutting unit that can be moved as one unity and relative to the frame in the horizontal plane, in particular in the direction of movement of the frame, the X-direction, and in the direction transverse thereto, the Y-direction, which orienting and cutting unit in dependency on the data provided by the camera can be moved for orienting the cutter in the horizontal plane relative to the crown, in particular relative to the center of the crown.

As already discussed above said unit can further comprise a stripper, that may or may not be constituted by the cutter itself, when the stem has leaves to be removed therefrom. An (eighth) drive may have been provided here as well, for vertically moving the orienting/cutting unit, optionally including a stripper function.

The crown position determiner can be configured and operative in accordance with the vision system described above. Other aspects discussed above may also apply here, individually or in combination with each other.

The crown position determiner can comprise a camera. The camera can be situated above the stripper and cutter, in particular straight above it. The lens center line of the camera can be oriented vertically downwards. This does not only enhance the compactness, it also enhances the possibility of using the device in two subsequent (drive) directions without turning around.

The orienting and cutting unit, as mentioned above, can be moved along guides in the X-, Y- and Z-directions or at least for a substantial part of the movements can be moved by a robotic arm.

According to a further aspect, the invention provides a method for harvesting vegetable crops from the ground, which vegetable crops have a stem and a crown supported by the stem and leaves attached to the stem, wherein prior to severing the stem for detaching the crown and optionally a part of the stem from the ground, a stripper is brought into engagement with the stem under the crown in the upper part of the stem and is subsequently urged downwards along the stem while stripping the leaves from the stem, after which the stem is severed.

As discussed above, it may in certain circumstances be advantageous if the stem is severed at a location above the stripper.

In other circumstances, it may be advantageous if the stem is severed using the stripper itself.

During stripping, the stripper may be able to engage all around the stem.

In one embodiment, the stripper is moved from the top down over the crown to a position for engaging the stem and for subsequent stripping.

In one embodiment, the stem is severed by a blade, wherein the blade is being used as a transporter of the severed upper part of the vegetable plant, to a location of discharge. In the function of transporter, the blade can be moved in vertical direction.

In the discharge position a guide can be placed under the blade and the blade can be placed in an inactive position for discharging the severed upper part to the guide under the influence of gravity, which guide guides the severed upper part to a discharge or receptacle under the influence of gravity.

If after severing the stem, the stripper and the blade are jointly being moved upwards, returning the stripper and blade coincides with the upward transportation. The cutter and the stripper can form a unit that can be moved as one unity.

In one embodiment, the location of the vegetable plant crown is determined by a vision system having a camera and a programmable control unit and the position of the stripper and the cutter relative to the crown, in the X-direction and/or in the Y-direction, is being set in dependency on the camera images. In one embodiment, the camera, as a unit with the stripper and the cutter, is for that purpose being moved in the horizontal plane, in particular to take the camera at least substantially to above the center of the crown, in particular considered in a vertical projection on a horizontal plane. This may for instance be the center of a best-fit circumscribed circle of the crown or the surface center of gravity. In one embodiment, the camera is then held straight vertically above the stripper and cutter, with the lens direction vertically downwards.

In one embodiment, an indication of the girth of the vegetable plant crown is provided by means of a vision system with a camera and a programmable control unit, and in the control unit the crown girth indicated by the vision system is compared to a pre-entered reference girth size, and on the basis of said comparison the stripper and the cutter are either activated or not activated.

The vision system can be configured for when the vegetable plant crown enters the image frame of the camera, detecting a peripheral area of the crown, in contrast with the surroundings. The camera can then be set so that the image frame of the camera in the X- and Y-directions is larger than the largest crown girth to be expected of the plants to be harvested. Depending on its location in the Y-direction in the image frame, in one embodiment, the control unit controls the drive for a movement of the unit of camera, cutter and optionally stripper in the Y-direction for moving the camera image frame, and thus the camera, for enlarging and indicating, and maximizing the detected peripheral area present in the image frame and finally for centering the indicated area of the crown in the image frame in the Y-direction. The unit of camera, cutter and optionally stripper is then moved by its drive in the X-direction for compensating for the onward movement of the device. In that way, the camera, and therefore the unit of camera including cutter and optionally stripper, to a certain extent is self-piloting relative to the (center of the) crown.

The subject matter as described in the attached claims should be considered as being inserted and repeated here in the description.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

BRIEF DESCRIPTION OF THE DRAWINGS

The invention will be elucidated on the basis of an exemplary embodiment shown in the attached drawings, in which:

FIGS. 1A-C schematically show a side view, a top view and an end view, respectively, of an exemplary embodiment of a device according to the invention;

FIG. 7 shows an impression of a multiple device according to the invention.

DETAILED DESCRIPTION OF THE DRAWINGS

Figure 1B:
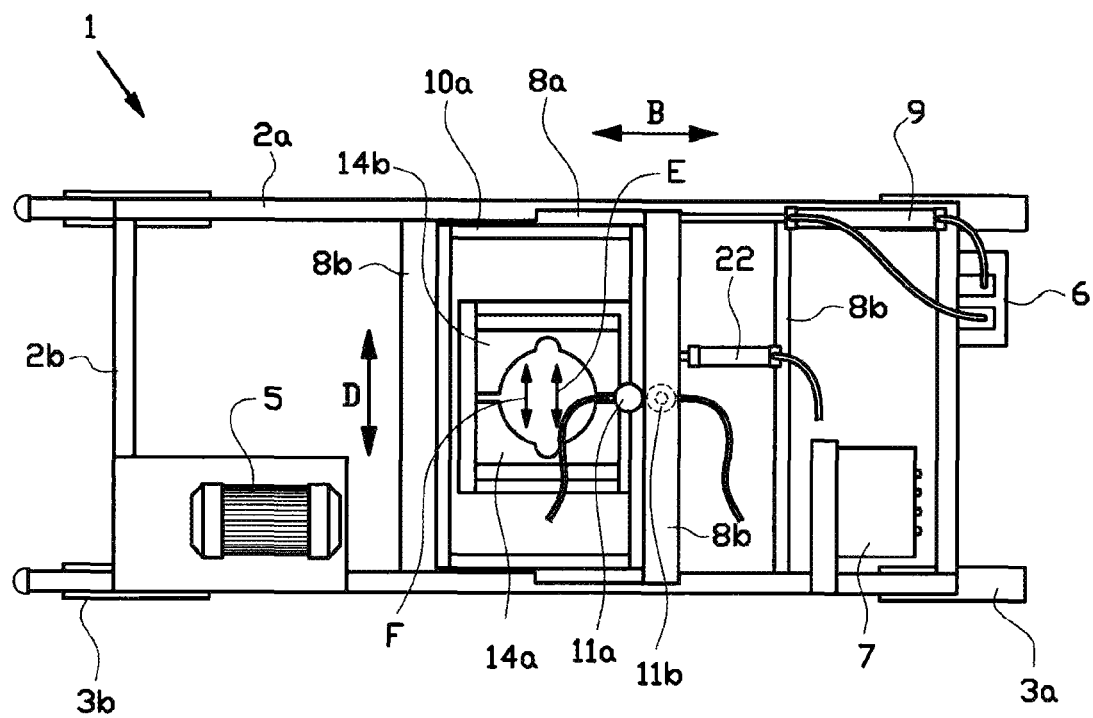
Figure 1C:
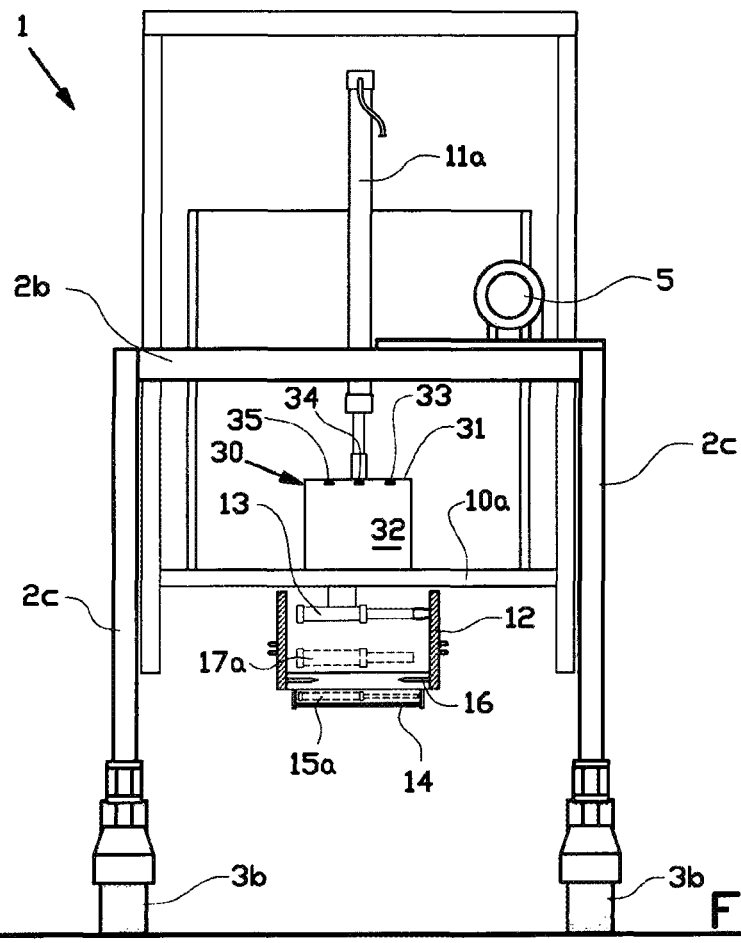

The—unmanned—harvesting machine 1 in FIGS. 1A-C comprises a main frame 2 having longitudinal girders 2a, transverse beams 2b and columns 2c supporting the rectangular assembly of longitudinal girders and transverse beams. The main frame 2 is supported by wheels 3a,b arranged at the lower end of the columns 2c, wherein the wheels 3a are rigid casters that can be driven by hydraulic motors 4 (first drive), for moving the machine 1 in the directions A, and the wheels 3b are swivel casters. The hydraulic motors 4 are fed by a pump 5 driven by a fuel engine. The fuel tank, the fuel engine and the tank of its hydraulic system are not shown. Shown further are a valve block 6 of the hydraulic system and a central, programmable control unit 7, both attached to the main frame 2.

The main frame 2 further supports a tray 18, indicative for a receptacle or a discharge of harvested products, which may for instance also be a conveyor, and which is positioned above the profile of the crop.

The main frame 2 supports an auxiliary frame or third partial frame 8, that can be reciprocally moved by a hydraulic cylinder 9 (sixth drive), having a casing 9a and rod 9b, and being operative between a longitudinal girder 2a and the auxiliary frame 8, the movement taking place in directions B parallel to directions A, guided by the longitudinal girders 2a. The auxiliary frame comprises two longitudinal girders 8a and a number of transverse beams 8b and columns 8c.

The auxiliary frame 8 supports a flap 20 that is able to hinge about an axis 21 (directions K) by means of a hydraulic cylinder 22 (fifth drive) between an inactive position vertically hanging down and an inclined guide position, for guiding harvested products to the tray 18, et cetera.

The auxiliary frame 8 supports a further auxiliary frame or second partial frame 10, that can be moved up and down in directions C by vertical cylinders 11a,b (eighth drive) that are operative between the auxiliary frame 8 and auxiliary frame 10. The cylinders 11a and 11b are connected in series and oppositely oriented. In that way, the oil released when retracting the one cylinder can be used for allowing the other cylinder to extend. In the vertical motion the further auxiliary frame 10 is guided by one or more guides 19 that are fixed to the auxiliary frame 8. The further auxiliary frame 10 comprises a number of horizontal structural members 10a,b such as box profiles, and vertical structural members, such as box profiles. At the lower end, the rod of the cylinder 11a is attached to a transverse member 10b, the opposite cylinder end is attached to a yoke 24, onto which also the end of the rod of the cylinder 11b is attached, of which cylinder the opposite end is attached to a transverse beam 8b of the auxiliary frame 8.

The auxiliary frame 10 supports a next auxiliary frame or first partial frame 12, which relative to the second auxiliary frame 10 can be reciprocally moved in transverse directions D by a cylinder 13 (seventh drive). The auxiliary frame 12 supports a leave stripper 14 and a stem cutter 16 situated just above it. The stripper 14 comprises two stripper blades 14a,b which can be moved towards and away from each other in the directions E by cylinders 15a,b (fourth drive). The cutter 16 comprises a blade and counter blade 16a,b which can be moved towards and away from each other in the directions F by cylinders 17a,b (second drive). In this example the directions D, E and F are parallel, but in the invention, it is also possible that one or two directions are perpendicular to the two or one other direction(s). Alternatively, use can be made of a reciprocally movable blade and a dedicated anvil, which anvil is held adjacent to the stem.

Figure 3A:
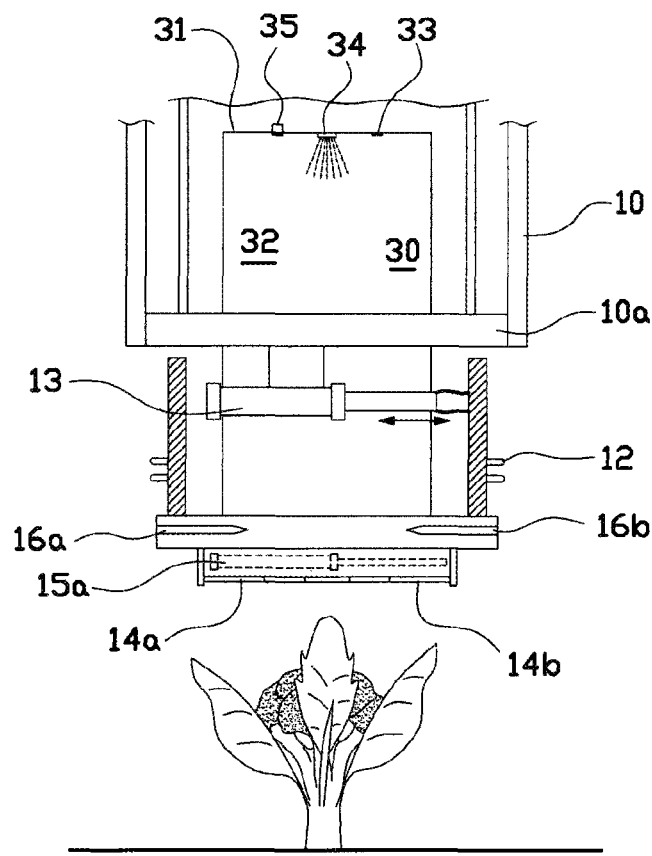
FIGS. 3A-E show a few process steps of FIGS. 2A-F, in detail.

The auxiliary frame 12 further supports a housing 30 (also see FIG. 3A) having an upper wall 31 and a circumferential wall 32 and being open in downward direction. The housing 30 in fact forms a cabinet that is open at the bottom side, in this example having a rectangular horizontal cross-section. In the upper wall, lighting facilities have been built in, for instance IR-LED lights 33. Said lighting is used for a camera 34, in this example a CCD camera or a CMOS camera, disposed in the upper wall. The camera 34 is part of a vision system, the control unit of which is incorporated in the central control unit 7. The vision system is configured for detecting the crown of a broccoli plant in the camera image by means of contrast measurement. The image data are used in the central control unit 7 for moving the auxiliary frame 12 and thus the camera 34 and the stripper 14 and the cutter 16 relative to the frame 2 by means of controlling the cylinders 9 and 13 in the B- or the X-direction and in the D- or Y-direction, respectively. The camera 34 is oriented vertically and placed concentric to the center between both stripper blades 14a,b. In their inactive position the blades and the stripper blades are kept at a sufficiently large distance from each other to have a sufficiently large image frame of the camera of the area below it. The circumferential wall 32 ensures that the image of the camera is disrupted as little as possible by natural UV-radiation: when the sun is shining on the crown, reflection may cause disruption of the camera image. Controlling the cylinders 9 and 13 takes place such that the crown of the broccoli plant is taken to the center of the image frame of the camera as much as possible and kept there.

The distance between stripper 14 and the upper wall 31 is larger than the crown depth+stem length to be harvested along with it, of the plants to be harvested. Further disposed in the upper wall 31 of the housing 30 is a distance sensor 35, operative on the basis of IR radiation or ultrasonic, by means of which the distance from the upper wall 31 to the upper side of the crown can be determined. The distance sensor 35 is connected to the central control unit 7, with which, on the basis of the data provided by the distance sensor 35, the cylinders 11a,b are controlled.

In this specification, the auxiliary frame 12 is also called first auxiliary frame, the auxiliary frame 10 is also called second auxiliary frame and auxiliary frame 8 is also called third auxiliary frame.

Figure 2A:
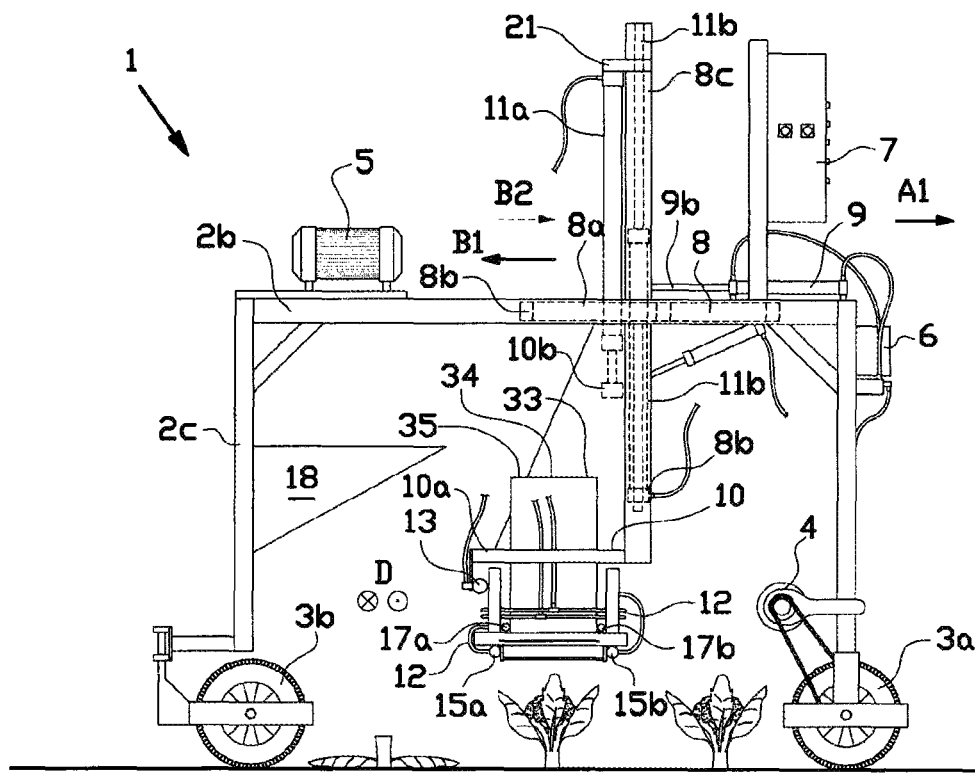
FIGS. 2A-F show an example of the use of the device of FIGS. 1A-C, in consecutive process steps.

In operation, see FIG. 2A, the harvesting machine 1 is moved onward in the direction A1, at uniform speed or intermittently, overhead of a row of plants to be harvested, in this case broccoli plants. It is noted that in the drawings the plant to be harvested and the frame 2 are depicted stationary, however, it will be understood that the frame moves in direction A1. The cylinders 11a,b keep the second auxiliary frame 10 at an initial height of for instance 0.3 m above the crowns of the plants to be harvested at such a height that the plants to be harvested certainly will not be contacted, that means above the plant profile, and the camera has a sufficiently large image frame, larger than the crown girth in the horizontal plane. The height of the plant profile has been determined beforehand and an estimation of the crown girth in vertical direction, also called crown depth, has also been made for the crop to be harvested. The estimated crown depth together with the known distance between sensor 35 and stripper 14 results in a boundary distance between sensor and crown upper side, at which boundary distance the stripper will then be situated just below the crown, in a starting position for stripping. Said boundary distance, for instance 5 cm, has been entered into the control unit 7.

Furthermore, the desired stroke of the stripper is entered in the control unit 7. Said stroke can be relatively short if the crown is practically the only part one wishes to harvest, for instance in order to remove the florets from them at a later stage, or slightly longer, to harvest a desired length of (leafless) stem along with it.

The inactive positions and final positions of the cylinders 15a,b and 17a,b have furthermore also been entered in the control unit 7, in dependency on the largest crown diameter and the stem thickness.

The vision system is configured for once the crown of the broccoli plant enters the image frame of the camera 34, detecting a peripheral area of the crown, in contrast with the surroundings. The camera has then been set such that the image frame of the camera in the X- and Y-directions is larger than the largest crown girth to be expected of the plants to be harvested. Depending on its location in the D- or the Y-direction in the image frame, in one embodiment, the control unit 7 controls the seventh drive, cylinder 13, in order to move the image frame of the camera, and thus the camera 34, in order to enlarge and indicate the detected peripheral area situated in the image frame and finally center the indicated area of the crown in the image frame in the Y-direction, also see FIG. 3A. This involves the control unit 7 to continuously or shortly consecutively process camera images for feedback, on the basis of contrast measurements in the recorded images. In a way, the camera is self-piloting with respect to the crown.

Following that or at least partially coinciding therewith, the central control unit 7 can also control the sixth drive on the basis of the camera images in order to also center the area that is an indication for the crown in the image frame in the X-direction. This involves moving the auxiliary frame 8, and therewith auxiliary frames 10 and 12, such in direction B1 relative to the main frame 2, that the movement as a result of the uniform onward movement of the frame is compensated for, so that the camera as it were remains above the crown. It is noted that in the drawings the position of the auxiliary frame 8 appears to be the same relative to the main frame 2 in the X direction, however, it will be understood that the auxiliary frame 8 is kept above the plant due to operating the sixth drive whereas the main frame 2 progresses in the direction A1.

Figure 2B:
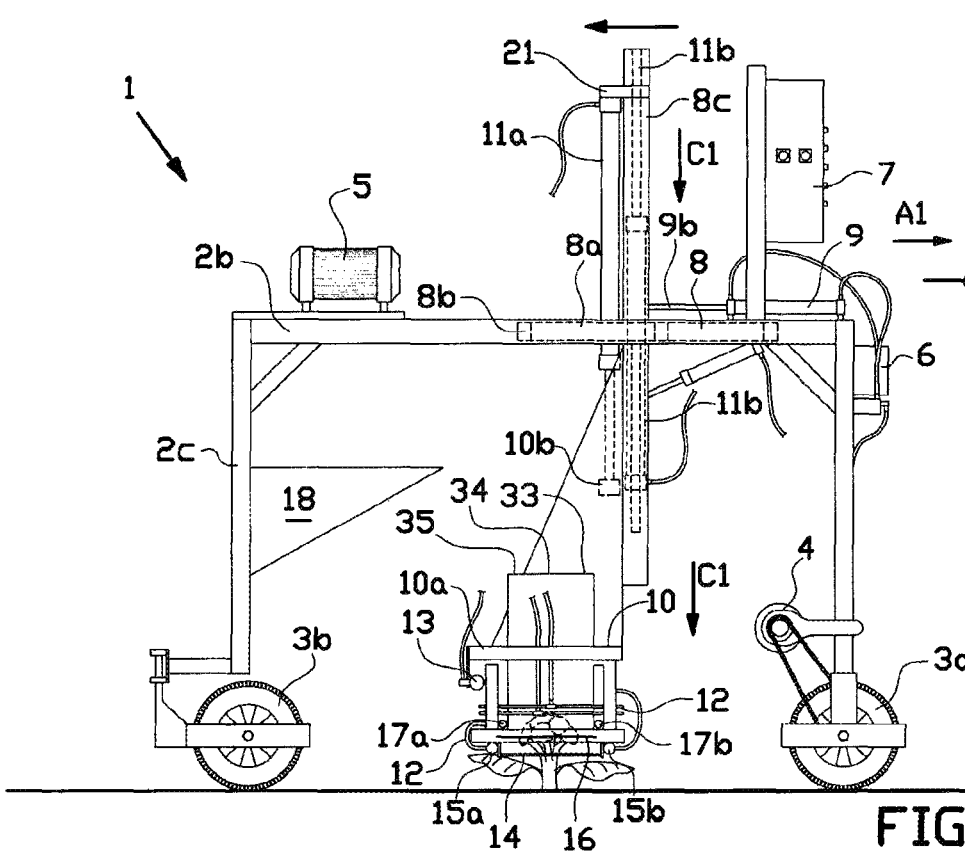
Figure 3B:
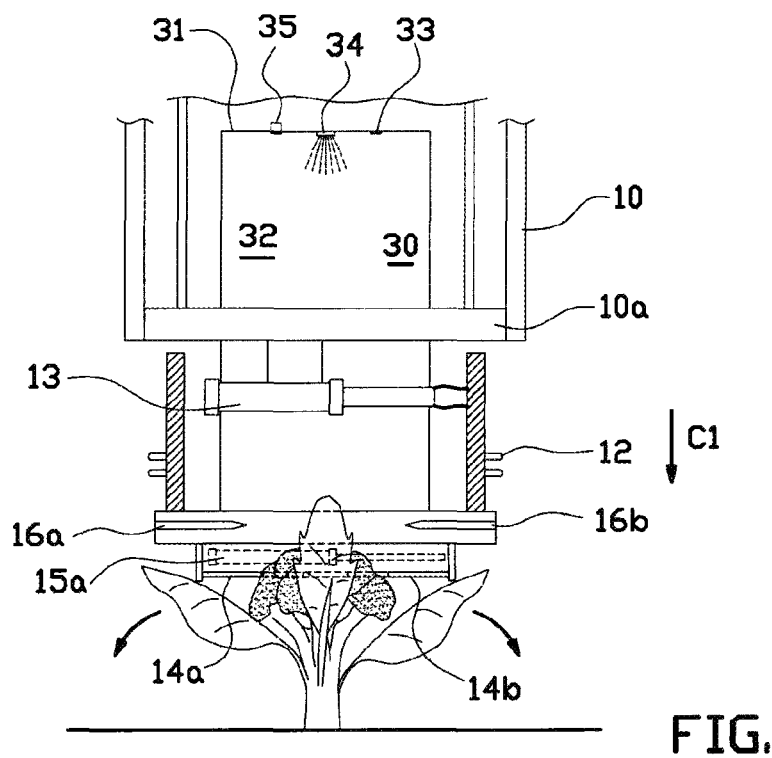
Figure 3C:
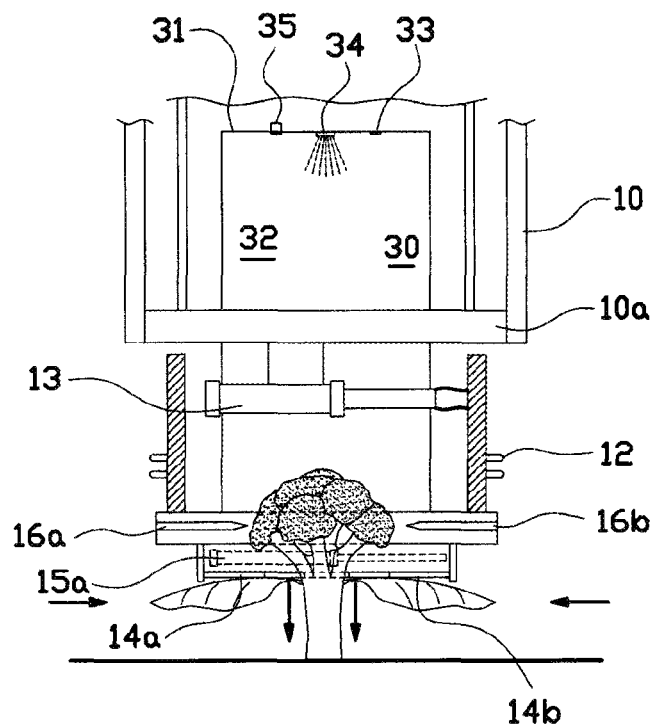
Figure 4A:
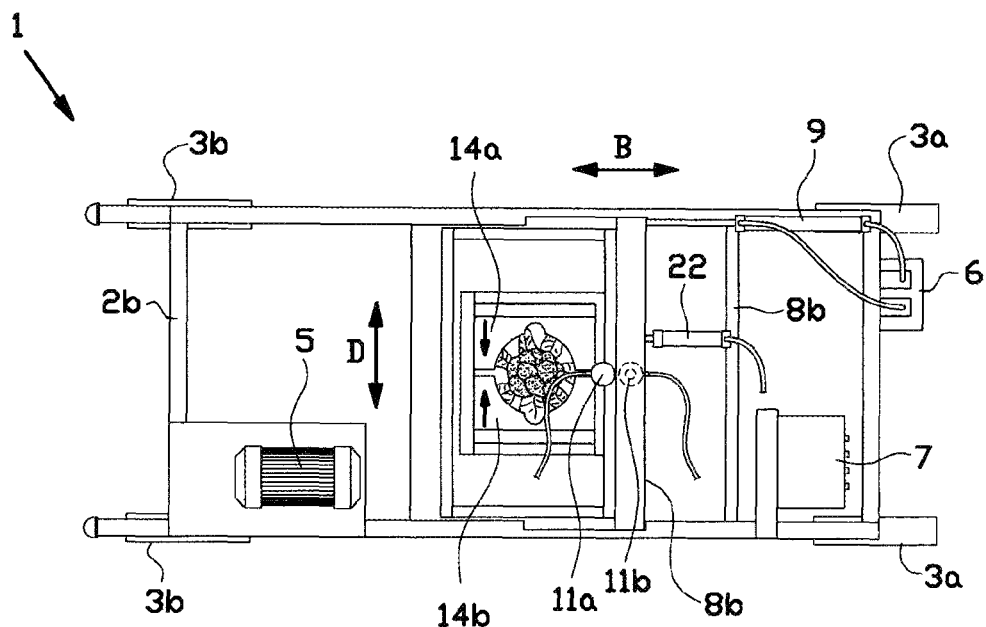
FIGS. 4A-B show a few process steps of FIGS. 2A-F, in top view.
Figure 4B:
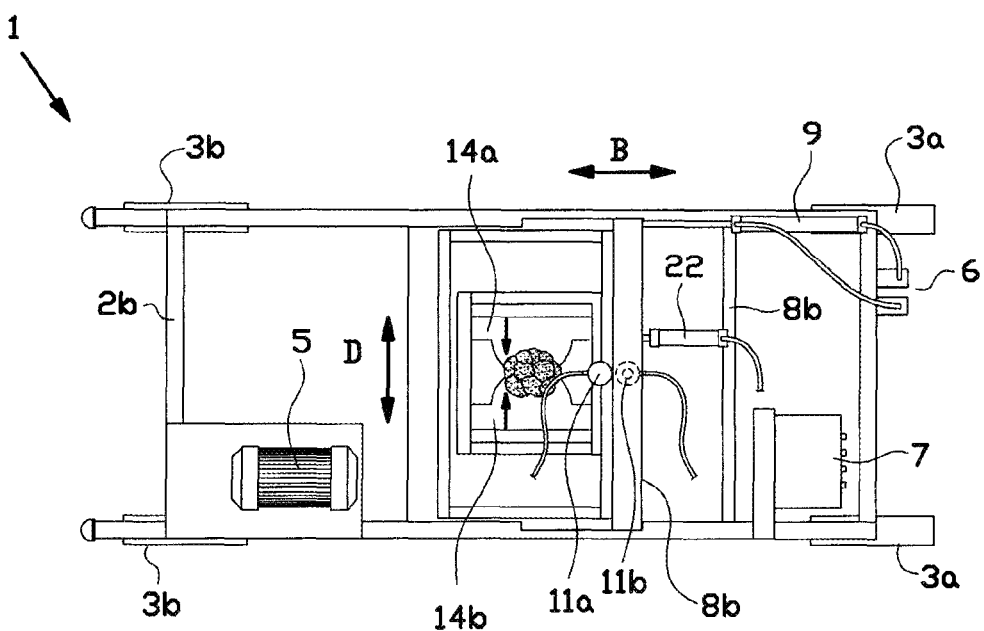

As soon as it is detected that the crown has ended up in the center of the camera image to an acceptable extent, also see FIG. 4A, the indicated crown surface is matched in the control unit 7 with a surface that has been entered in the control unit 7 beforehand, which surface forms a threshold value. If the crown surface indicated based on the camera image covers a smaller area than the threshold value, the harvesting process for this plant is broken off. If the indicated surface exceeds the threshold value, the control unit 7 controls the cylinders 11a,b for urging the auxiliary frame 10, and as a consequence auxiliary frame 12, downwards over a first step, direction C1, FIGS. 2B, 3B, at high speed. The distance over which this takes place depends on the distance measurement by sensor 35, as soon as the set desired minimum distance of the sensor to the crown has been reached said first downward stroke is stopped. In that process, the stripper 14 and the cutter 16, which have been vertically aligned with the crown by controlling the camera, have been taken along around the crown to a position in which the stripper 14 is at the wanted starting height. This involves leaves (covering leaves) extending upwards along the crown being bent away. Subsequently, the control unit 7 activates the cylinders 15a,b in order to move the stripper blades 14a,b towards each other, until in a position in which they extend around the stem, against the stem or close to the stem, to take variations in stem thickness and stem shape into account, also see FIGS. 3C and 4B.

Immediately subsequent thereto, the control unit 7 activates the cylinders 11a,b once more in order to have the stripper 14 strip the leaves from the stem over the preset length in a second, downward stroke. The leaves end up on the ground, FIGS. 2C and 3D.

Figure 2C:
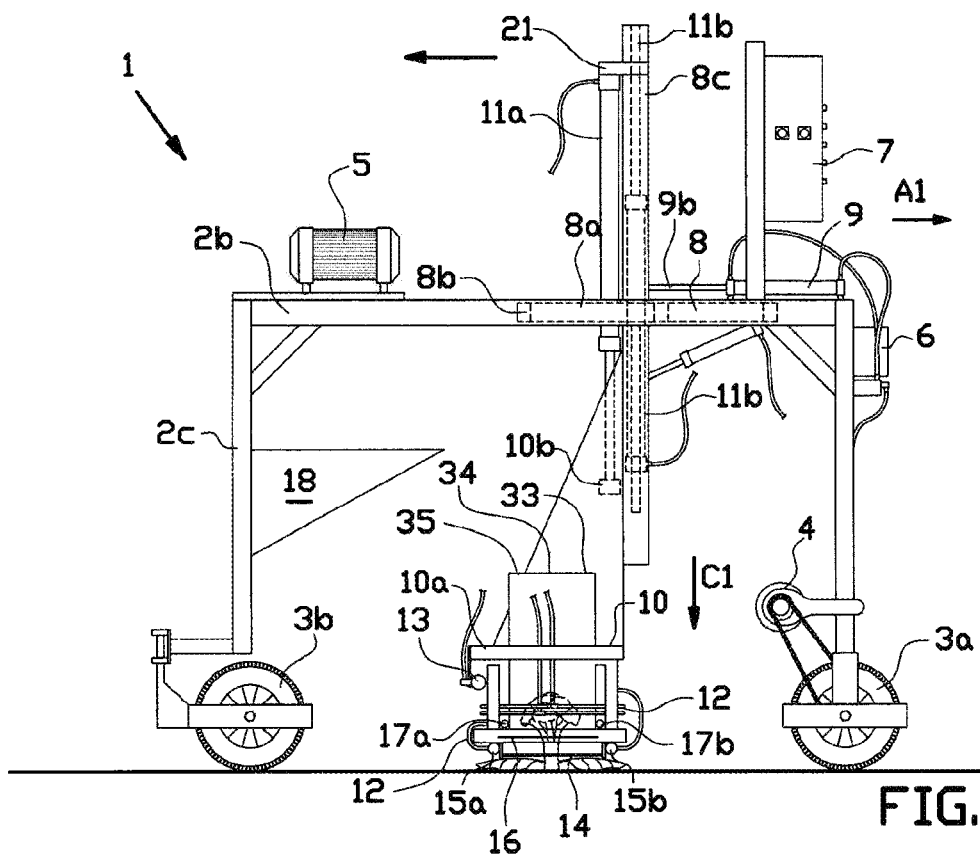
Figure 2D:
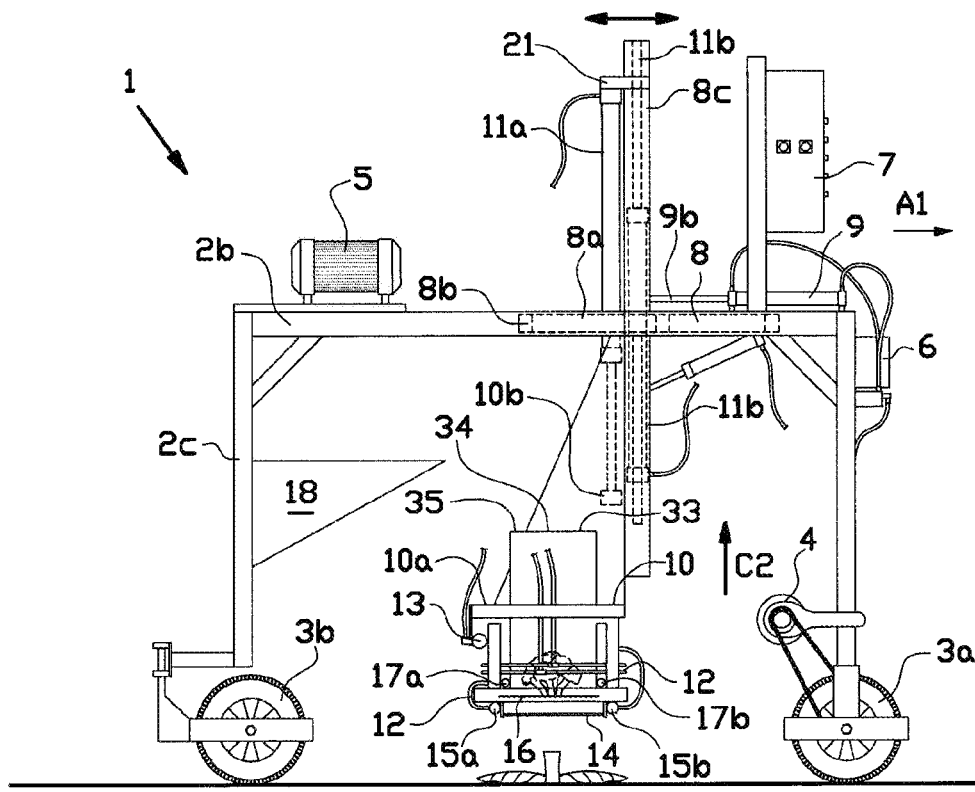
Figure 3D:
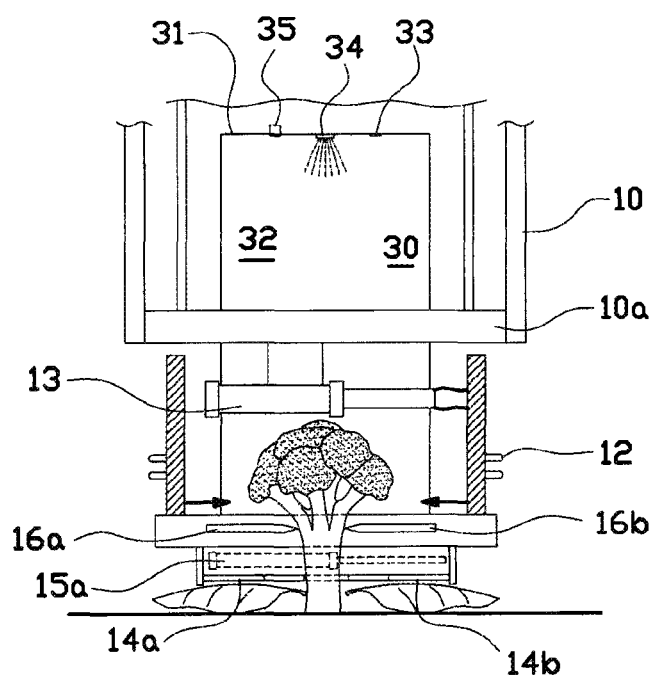

Immediately after stripping, the control unit 7 activates the cylinders 17a,b for at that location severing the leafless stem using the blades 16a,b, FIG. 2C. The cylinders 15a,b are then activated as well to return the stripper 14 into the initial position again. This can optionally also be done at a later moment.

It is noted that after orienting auxiliary frame 12 in the horizontal plane, immediately prior to starting the first downward stroke, the stripper blades 14a,b may have been taken to a shorter distance from each other by the cylinders 15a,b which distance has been entered beforehand in the control unit 7, adjusted to the crown diameter, in order to bend the leaves that are situated close to the crown downwards in the first downward stroke. By then the camera has already fulfilled its function and cannot be hindered by stripper blades extending in the image frame.

Figure 2E:
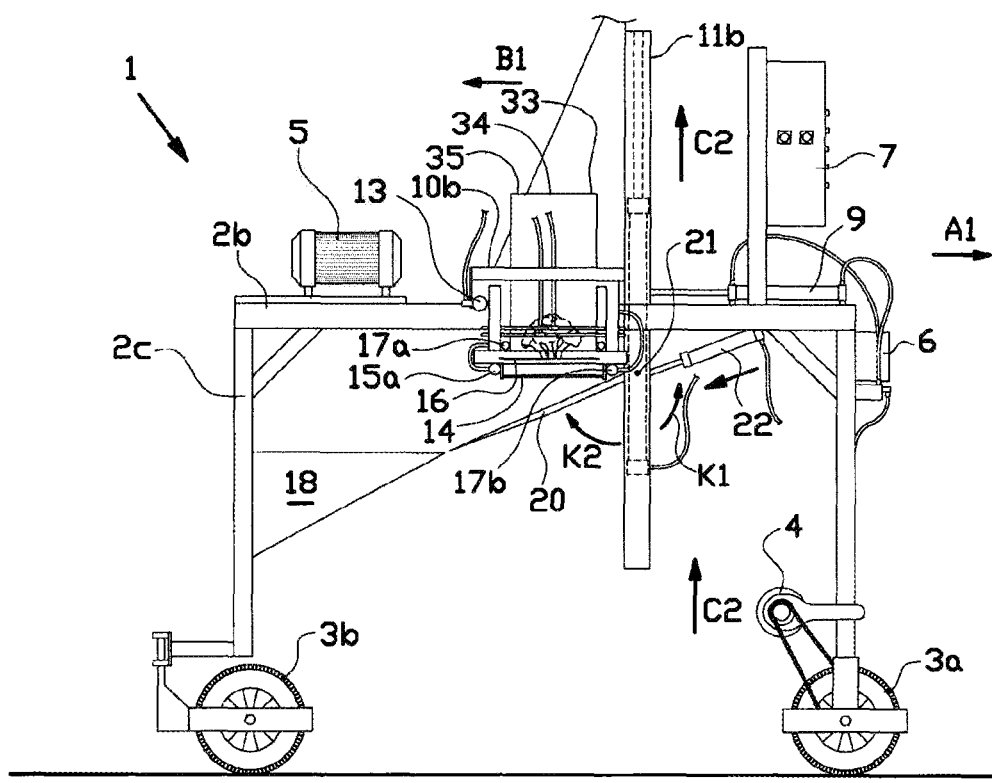
Figure 2F:
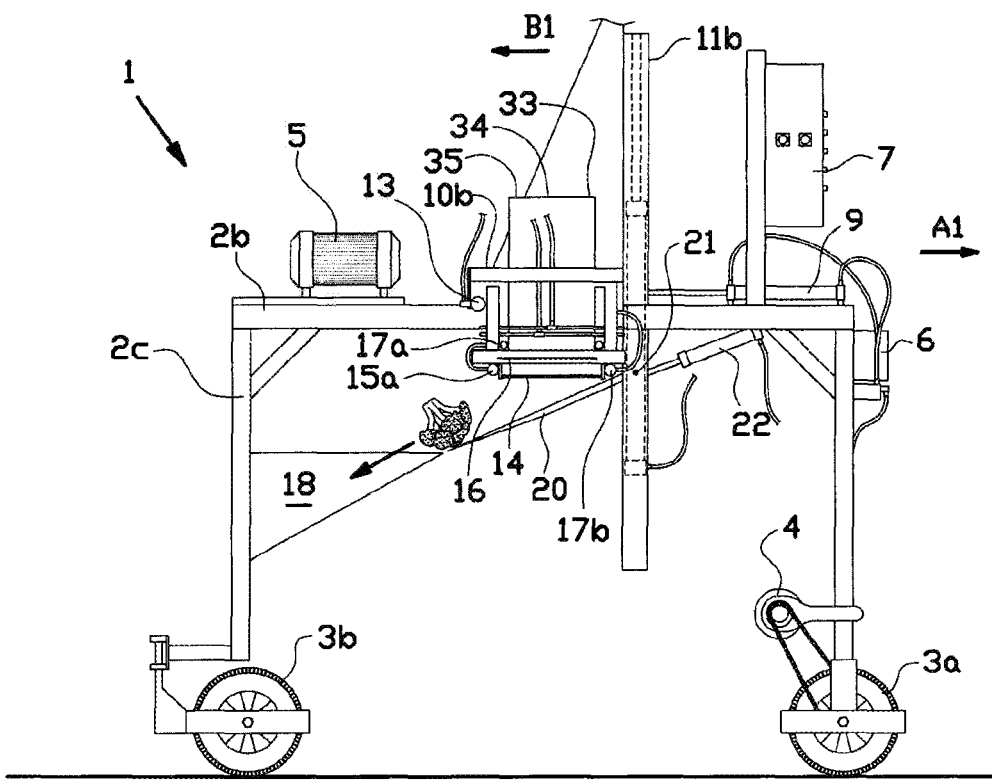
Figure 3E:
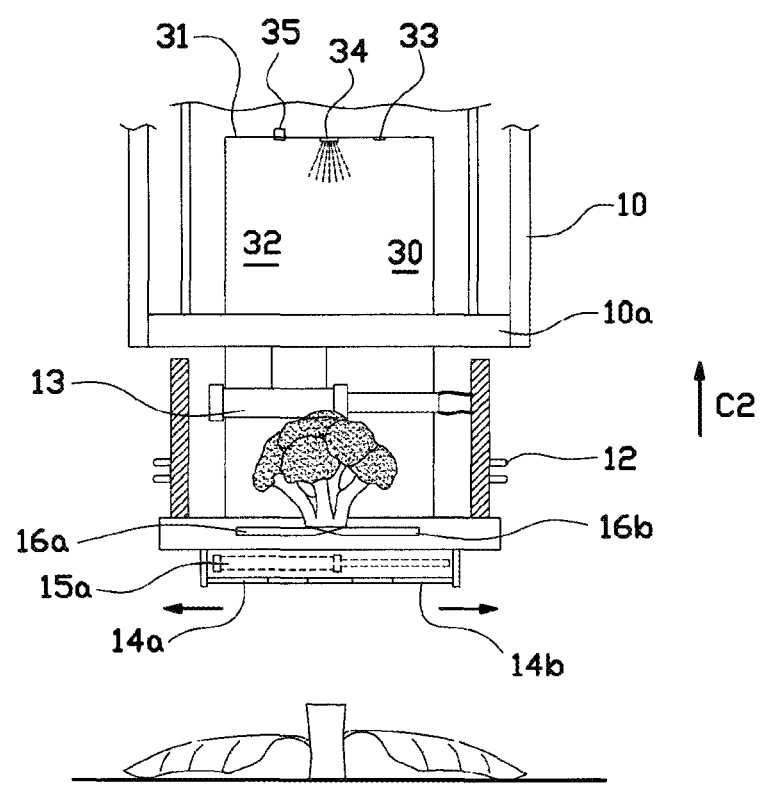

The cylinders 17a,b remain in the closing position of the blades, in order to let the blades function as a support for the severed upper part. Immediately after severing the control unit 7 activates the cylinders 11a,b for retrieving the auxiliary frame 10 with auxiliary frame 12, direction C2, FIG. 3E. This involves lifting the auxiliary frame 12 in an almost vertical path (there will be compensation—if any—in the X-direction by the cylinder 9 as a result of the device moving onward) until it is in a position entirely above the flap 20, immediately after which the control unit 7 activates the cylinder 22 for directly swinging the flap in the direction K2, about hinge 21 to the position shown in FIG. 2E. The control unit 7 then activates the cylinders 17a,b for returning the blades to their initial position, with which the support for the severed upper part is cancelled and the severed upper part, guided by flap 20 slides to the receptacle or discharge 18, FIG. 2F.

Immediately after that, the cylinder 22 is activated in order to return the flap 20 (direction K1) in the vertical position so that the cylinders 11a,b can be activated again in order to return the auxiliary frame 10 to the initial level again, see FIG. 2A, and then the process can be started over for the next plant in the row.

The progression speed of the harvesting machine is geared to the mutual distance of the plants in the row and to the time required for orienting the auxiliary frame 12 by means of the camera and the subsequent leave stripping, stem severing, lifting and discharging of the severed upper part.

As already noted above, the vision system can be configured for determining whether the crown of the plant possibly to be harvested is large enough to be harvested, for instance by determining one or more dimensions of the crown in projection on a horizontal plane. Said dimension(s) form(s) an indication for the crown girth and can be compared in the central control unit 7 to (an) entered reference value(s). Based on the outcome of said comparison the central control unit 7 subsequently either controls the drives operative for stripping and cutting the plant in question, or not.

Figure 5A:
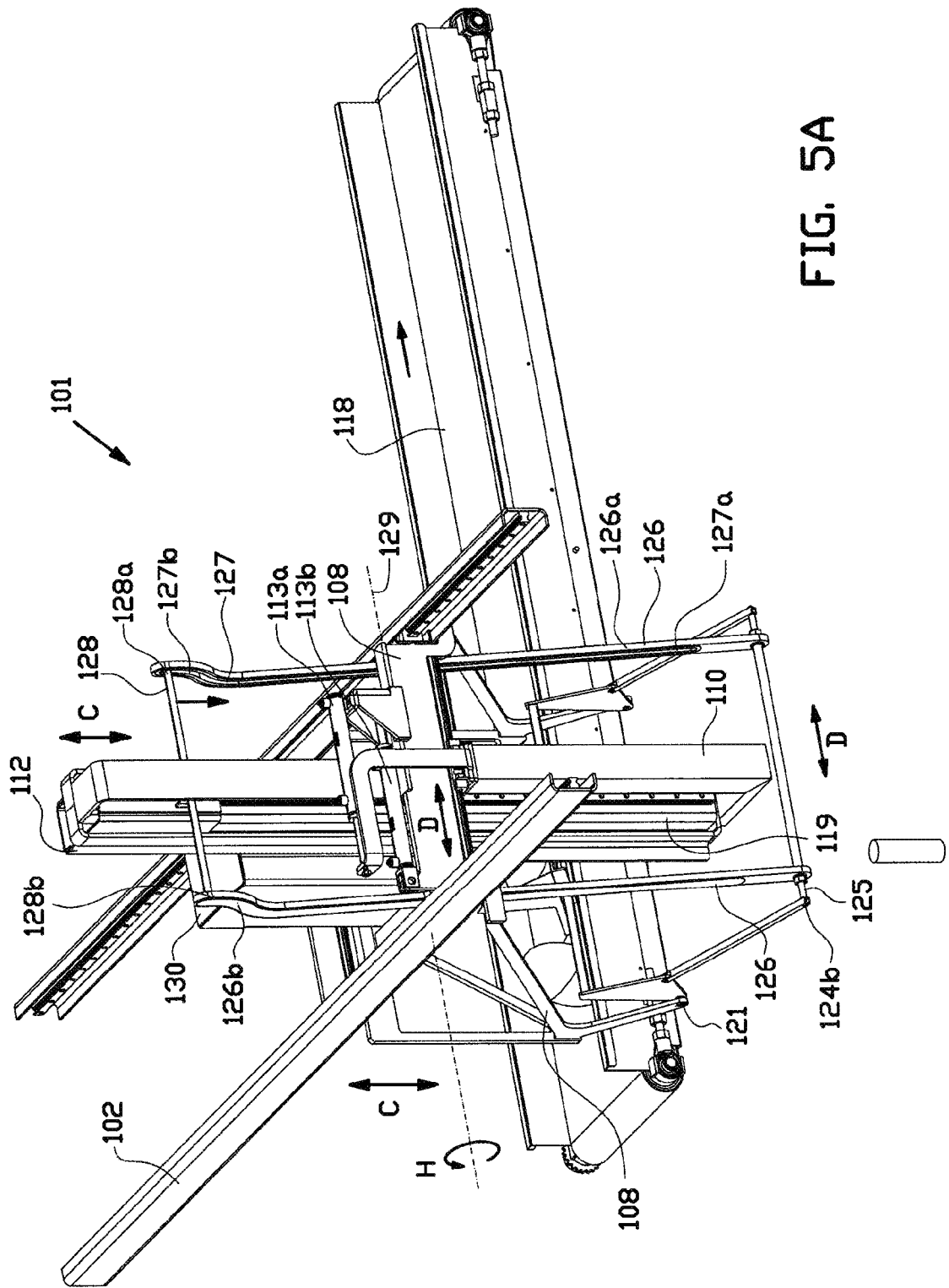
FIGS. 5A,B show a part of an alternative embodiment of a device according to the invention.
Figure 5B:
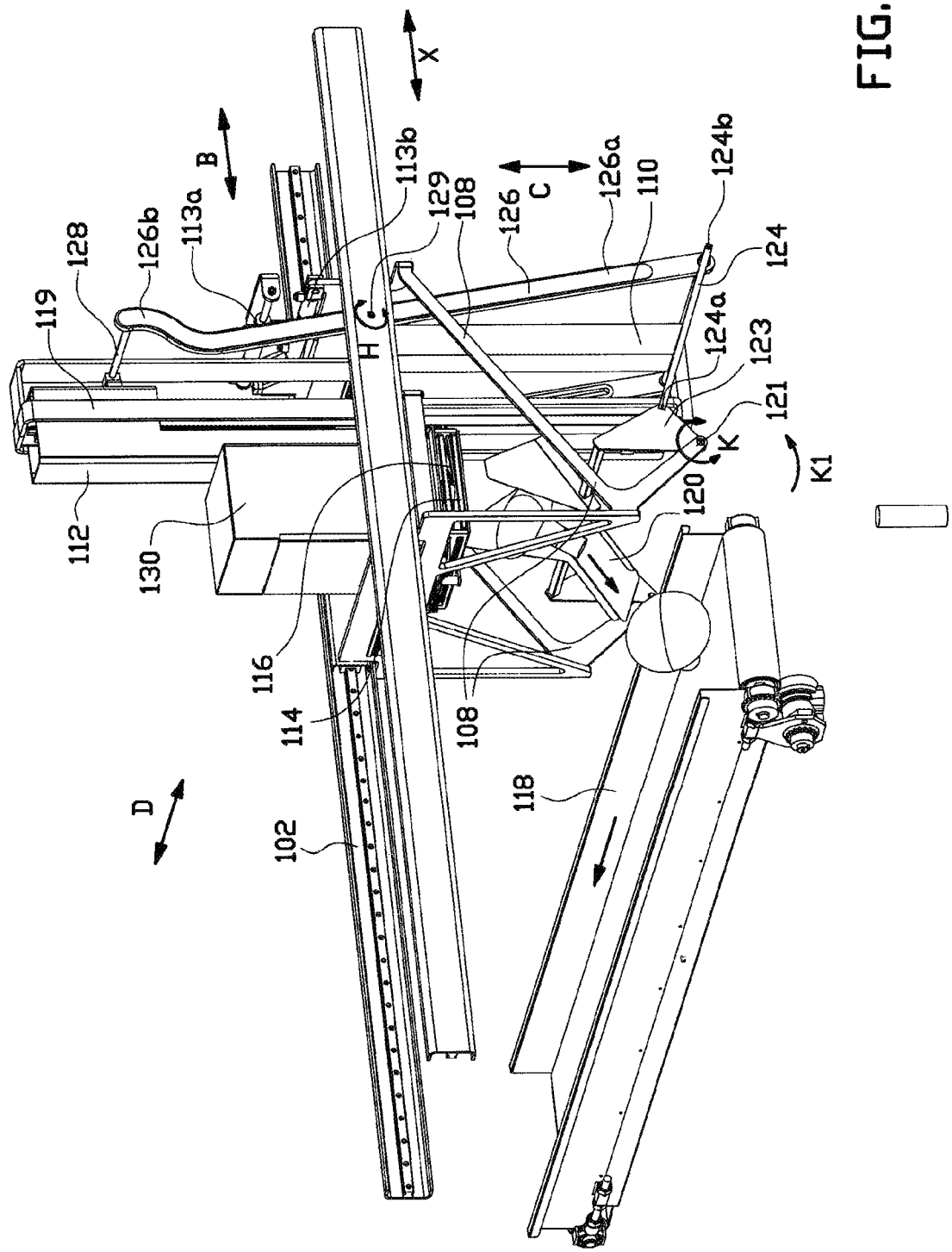

In the alternative embodiment 101 shown in FIGS. 5A,B, there is once more a division in partial frames, namely first auxiliary frame or partial frame 112, having a stripper 114 and cutter 116 and a camera casing 130, like in the previous example, second auxiliary frame or partial frame 110 and third auxiliary frame or partial frame 108. The third partial frame 108 can again be reciprocally moved relative to the (main) frame 102 in the X-direction by a cylinder (sixth drive) that is not shown. However, in this case the second partial frame 110 can be reciprocally moved in transverse direction, directions D, relative to the third partial frame 108, by means of a seventh drive in the form of two cylinders 113a,b connected in tandem, the principle of operation being in accordance with lifting cylinders 11a,b.

In this example, the first partial frame 112 can be moved up and down relative to the second partial frame 110, by means of cylinders (eighth drive) that are not shown here, which in essence correspond with cylinders 11a,b of the previous example. One single vertical guide 119 then guides the first partial frame 112. In a manner so as to be slidable in transverse direction (D), the first partial frame 112 supports a transverse rod (128) near the upper end, which rod with its ends extends in curve tracks 127 that have been provided in first, upright operation rods 126, which at the location of 129 (indicated indicatively, in the drawing screened off by frame parts 102) are attached in partial frame 108 so as to hinge (directions H). The upright operation rods 126 and therefore the curve tracks 127 have a largest portion 126a, 127a that is straight and an upper end portion 126b, 127b that is S-shaped, offset in a direction away from the vertical path of the first partial frame 112.

A transverse rod 125 is rotatably attached to the lower ends of the rods 126 and protrudes laterally from them. At the ends of the rod 125 there are ends 124*b* of second operation rods 124 that form link rods and with their other ends 124*a* are rotatably attached to side plates 123 of a guide 120. At a distance from 124*a,* said side plates 123 are furthermore rotatably attached to the third partial frame 108. Due to this construction, the guide 120 has an inactive position that is tilted upwardly (K1) relative to the active position. With means that are not shown, the guide 120 is pre-biassed to the inactive position.

Figure 6A:
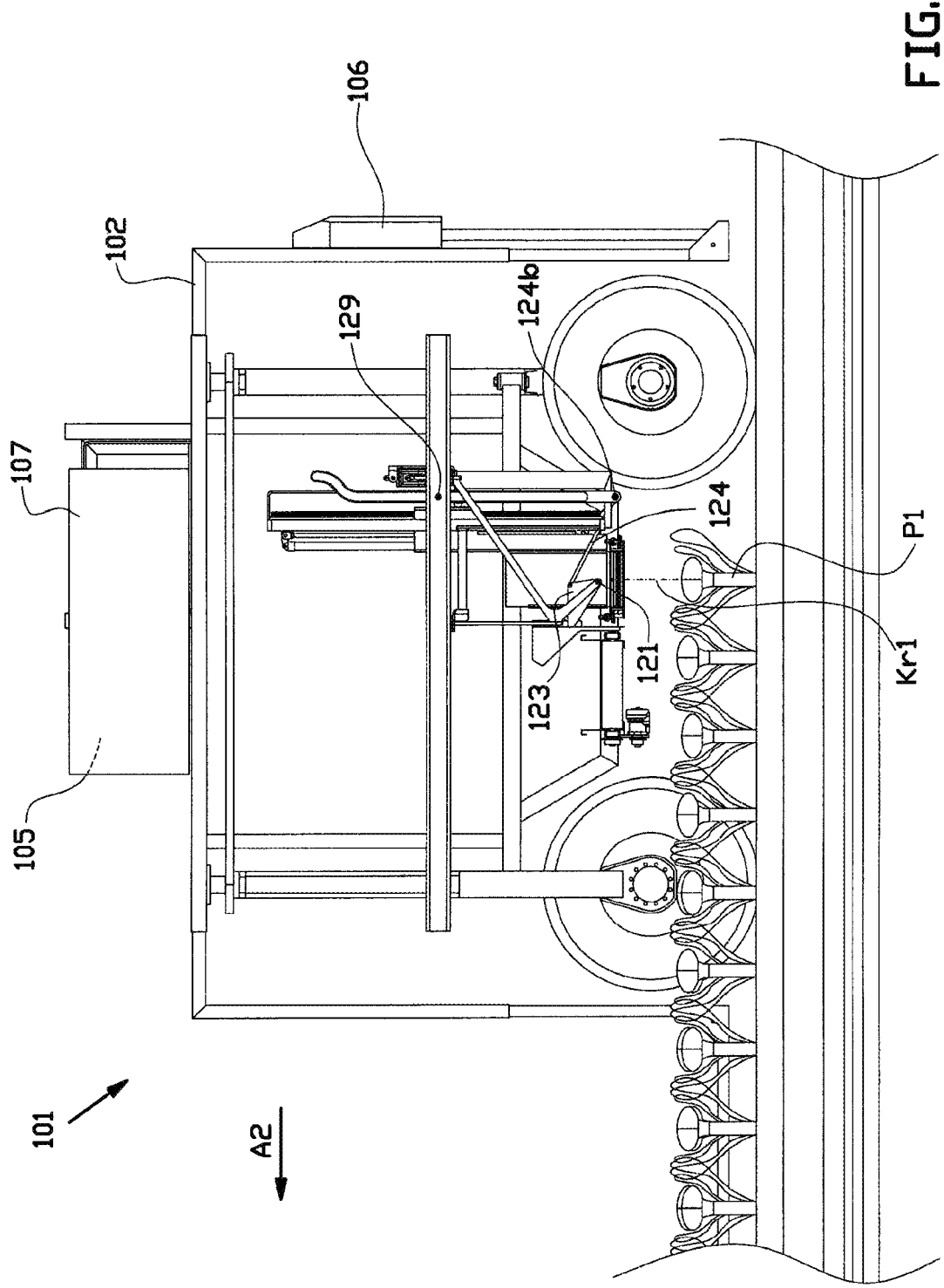
FIGS. 6A-C show a few process steps with the device of FIGS. 5A,B.
Figure 6B:
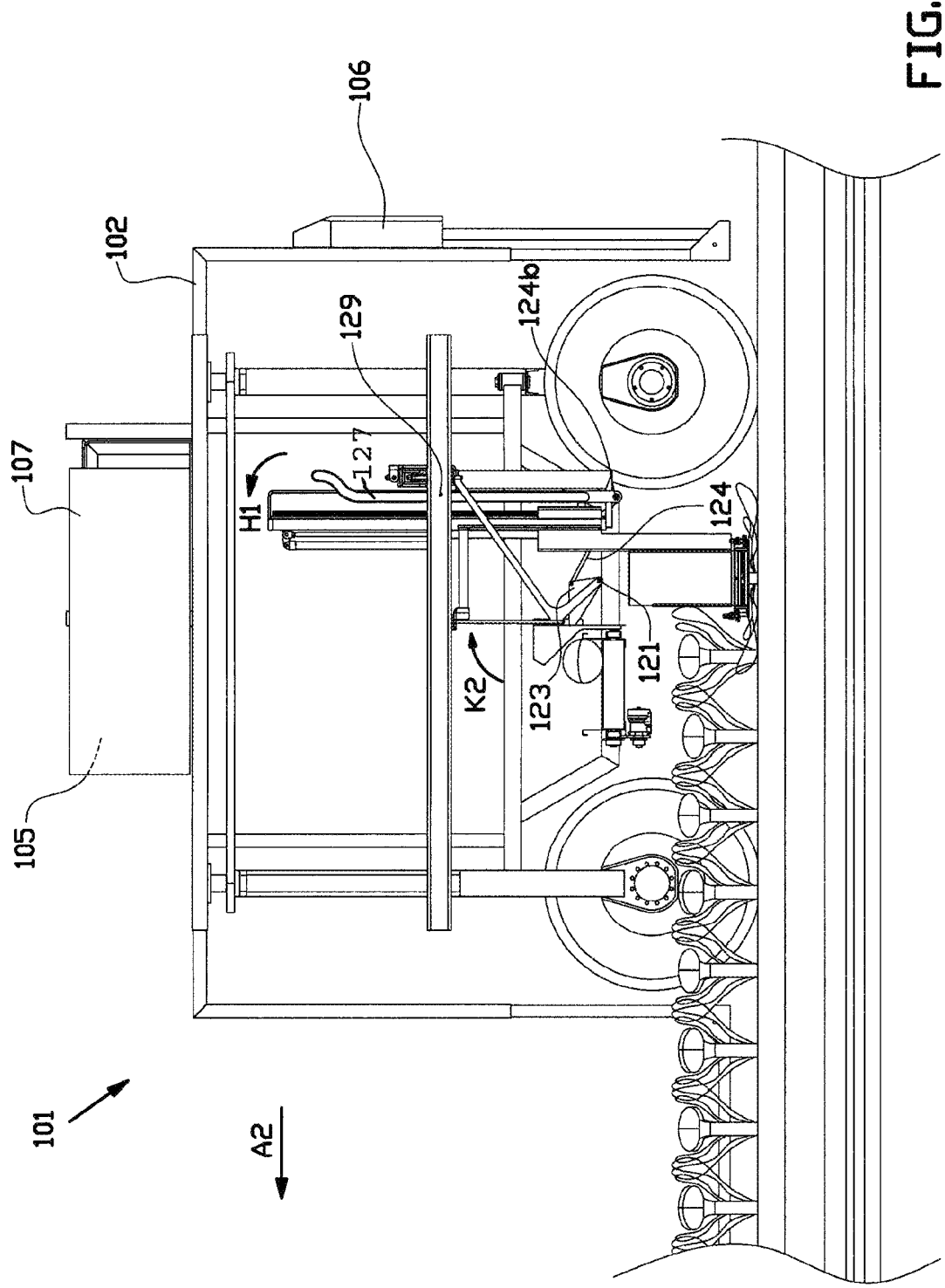
Figure 6C:
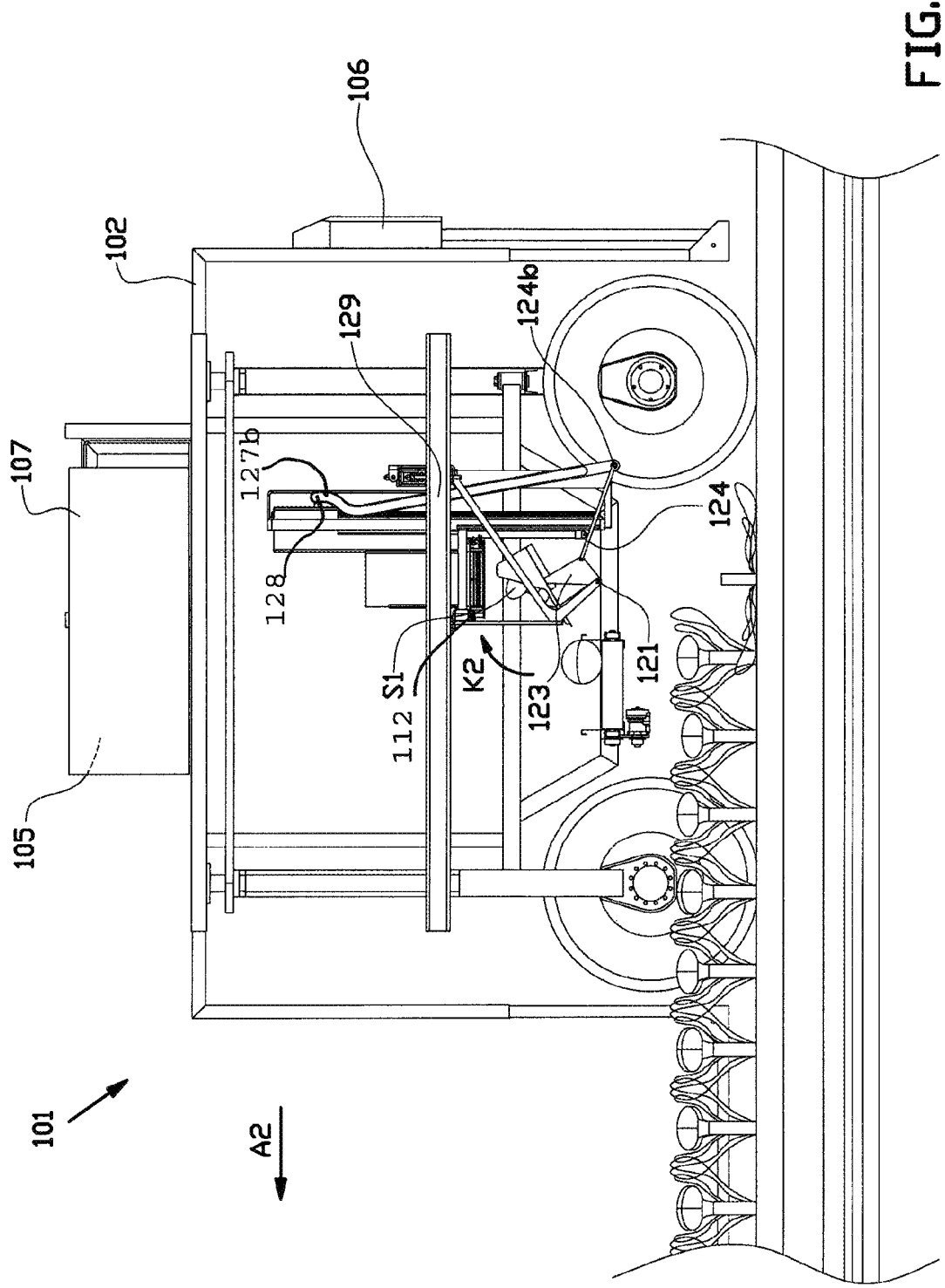

When operational, see FIGS. 6A-C, the assembly of first and second partial frame is situated at the starting height above the row of plants, in this case broccoli plants again. In FIG. 6A camera images are used by the central control unit 107 for centering the camera (and thus the stripper and the cutter) above the plant P1, in a manner as described above, now using cylinders 113*a,b* and the drive for the third partial frame 108 in the X-direction relative to the frame 102. When, in accordance with the explanation already given with the previous example, the control unit 107 has established that the camera is positioned above the indicative center of the crown K1, and it has moreover been established that the crown has the right dimensions, the control unit 107 activates the vertical drive of the first partial frame 112. Therewith in two consecutive downward steps, first the stripper 114 (and also the cutter 116) are moved over the crown K1 to a position just below it while bending away covering leaves, and once the stripper blades have been moved to near the stem, the stripper in strip position is subsequently moved along the stem for stripping the leaves from the stem. The eighth drive then also constitutes the third drive. Then the cutter 116 is operated, and the severed upper part of the plant, supporting on the cutter, is taken to the position of FIG. 6C in an upward stroke of the partial frame 112.

When moving the first partial frame 112 up and down, the ends 128*a,b* of the rod 128 that has been taken along, run through the curve tracks 127. When the ends 128*a,b* are in the straight portions 127*a* of the curve tracks 127, the operation rods 126 will be vertically oriented, parallel to the path of the first partial frame 112. In that condition, FIGS. 6A and 6B, the rods 124 keep the side plates 123 upwardly tilted in direction K1 as a consequence of which the guide 120 is kept beyond the vertical movement path of the first partial frame 112, so that the movement of the partial frame is not impeded. When in the upward stroke of the partial frame 112 the rod ends 128*a,b* arrive in the S-shaped end portions 127*b* of the curve tracks, the operation rods 126 will tilt about hinges 129 in the direction H1 into the sloping position of FIG. 6C. This is geared to the lower end of the first partial frame 112 passing through to above the tilting path of the guide 120. Due to the rods 126 tilting, the side plates 123 are pulled at via the rods 124 and the guide 120 tilts about hinges 121, counter the pre-bias, in the direction K2 into a position straight below the first partial frame 112, FIG. 6C. The control unit 107 subsequently opens the cutter 116 and the severed upper part S1 can drop onto the guide 120 which facilitates its slide down to the discharge belt 118. The drive for the first partial frame 112 thus indirectly constitutes a drive for moving the guide 120 from the inactive position to the active position.

When subsequently moving the first partial frame 112 downwards again, the rod ends 128*a,b* soon arrive in the straight portions 127*a* of the curve tracks 127 and the rods 126 tilt to the vertical position again and the guide 120, aided by the pre-bias, will be tilted upwards once more, out of the path of the first partial frame 112.

In FIGS. 3A-E the harvesting device 1 works its way through the row of plants in direction A1, in FIGS. 6A-C in the opposite direction A2. Each time the harvesting device 1, 101 has arrived at the end of a row of plants, it can be aligned with an adjacent row of plants by means of a transverse movement and then, while retaining the orientation, ride in the opposite direction A2; A1 to harvest the plants in that row.

In FIGS. 1-6 the exemplary embodiment of the harvesting machine is singular. A multiple embodiment is possible, see FIG. 7, wherein several harvesting machines 201, at least the parts that are supported by the said main frame, are positioned in a direction transverse to the rows of plants, attached to a portal 200, which with frame 202 at its ends is supported by wheels 203 so as to be mobile. The multiple embodiment has a central drive for the wheels 203. The wheels 203 are pivotable. The discharge belt 218 is a common one for all harvesting machines 201. Both outermost harvesting machines have been placed beyond the path of the wheels 203 so as to enable the harvesting of a row of plants at that location as well. The distance in transverse direction between the harvesting machines 201 can be set. The harvesting machines 201 can also be removed, so that the remaining harvesting machines 201 can be exactly aligned with the rows of plants.

This harvesting device according to the invention as well, can be operative in both directions A1,A2. When arriving at the end of the rows of plants the multiple harvesting machine can be moved in transverse direction on a headland using the swivel casters in order to be positioned correctly for a return stroke, in which other rows of plants are being harvested. The multiple harvesting device can be provided with a directional sensor operative in a wheel track, based on the data of which the wheels 203 are kept correctly oriented to follow the tracks between the plants. Said directional sensor can also be provided in singular harvesting machines discussed above.

By way of example: the portal may have a length of 7.5 m, the rows of plants may be 75 cm apart, the depicted possible paths for the wheels can then be situated 1.5 m apart. The range in transverse direction of each harvesting machine will then for instance be 65 cm.

It is noted that apart from hydraulic, one or more of the drives can have other configurations, for instance pneumatic or electrical, such as in the form of servo-electric motors.

The above description is included to illustrate the operation of preferred embodiments of the invention and not to limit the scope of the invention. Starting from the above explanation many variations that fall within the spirit and scope of the present invention will be evident to an expert.

The invention claimed is:

1. A device for harvesting vegetable plants from the ground, the vegetable plants having a stem, a crown supported by the stem, and leaves attached to the stem, said device comprising:
   a frame;
   a first drive configured to move the frame over the ground;
   a cutter configured to sever the stem;
   a second drive for the cutter;
   a stripper movable between a free position in which the stripper is free from the stem and a strip position in which the stripper engages onto the leaves at least near the stem; and
   a third drive configured to move the stripper vertically downwards along the stem for the stripper to strip the leaves from the stem in the strip position,
   wherein the stripper comprises two or more stripper members, and
a fourth drive configured to move the stripper members towards each other and away from each other between the free position in which the stripper members are free from the stem and the strip position in which the stripper members engage onto the leaves at least near the stem.

2. The device according to claim 1, wherein the fourth drive is configured to move the stripper members towards each other and away from each other between a free position, in which the stripper members leave a passage for the crown free in between the stripper members, and the strip position.

3. The device according to claim 1, wherein the stripper members are configured to extend jointly around the stem in the strip position, the stripper members comprising two stripper members that are disposed diametrically opposite each other.

4. The device according to claim 1, wherein the cutter comprises one or more blades, the cutter being situated above the stripper.

5. The device according to claim 1, further comprising:
a lift;
a lift drive configured to move an upper part of the vegetable plant to a higher level when the upper part of the vegetable plant is severed by the cutter, in at least the substantially vertical direction, the cutter forming a support that is part of the lift for a portion of the severed vegetable plant situated above the cutting surface;
a discharge for the severed upper part of the vegetable plant;
a transfer device configured to transfer the severed upper part of the vegetable plant from the lift to the discharge, the transfer device forming a guide for the severed upper part of the vegetable plant to the discharge, the guide including a sloping guidance surface, the second drive being configured to move the cutter to a position cancelling the support, the severed upper part of the vegetable plant being released to fall towards the guide to be guided to the discharge by the guide, the guide configured to be moved between an inactive position in which the cutter including the support is given vertical free passage, and an active position in which the severed upper part of the vegetable plant is received from the support and is guided to the discharge; and
a fifth drive configured to move the guide between the inactive position and the active position.

6. The device according to claim 1, wherein the cutter and the stripper are disposed on a first partial frame that is directly or indirectly supported by the frame, the first partial frame configured to be moved relative to the frame in one or more of:
(i) the X-direction that is a direction of onward movement of the frame by a sixth drive,
(ii) the Y-direction that is horizontally transverse to the X-direction by a seventh drive, and
(iii) the Z-direction by a eighth drive,
wherein the first partial frame is supported by a second partial frame that is supported by the frame, the seventh drive being operative between the first partial frame and the second partial frame.

7. The device according to claim 1, wherein the cutter and the stripper are disposed on a first partial frame that is supported by the frame, the first partial frame being disposed at an outer end of a robotic arm, which is attached to the frame, the first partial frame being configured to be moved by the robotic arm in the X- and Y-directions.

8. The device according to claim 1, further comprising an orienting device configured to orient the cutter and the stripper relative to the crown in the horizontal plane, the orienting device comprising a crown position determiner providing crown position data, the orienting device being configured to orient the cutter and stripper in the horizontal plane relative to the crown, at least substantially centered relative to the crown, depending on the provided crown position data.

9. The device according to claim 8, wherein the cutter and the stripper are disposed on a first partial frame that is directly or indirectly supported by the frame, the first partial frame configured to be moved relative to the frame in one or more of:
(i) the X-direction that is a direction of onward movement of the frame by a sixth drive,
(ii) the Y-direction that is horizontally transverse to the X-direction by a seventh drive, and
(iii) the Z-direction by a eighth drive,
wherein the first partial frame is supported by a second partial frame that is supported by the frame, the seventh drive being operative between the first partial frame and the second partial frame, and
wherein the orienting device is configured to depend on the data provided by the crown position determiner controlling either the sixth drive and the seventh drive or a position of an outer end of the robotic arm in the horizontal plane.

10. The device according to claim 9, wherein the crown position determiner forms a unit with the stripper and the cutter, the unit configured to be moved in one or more of (i) the horizontal plane and (ii) the vertical direction,
wherein the crown position determiner is attached to an assembly of the first partial frame and the second partial frame.

11. The device according to claim 8, wherein the crown position determiner forms a unit with the stripper and the cutter, the unit including the stripper and the cutter is configured to be moved in one or more of (i) the horizontal plane and (ii) the vertical direction.

12. The device according to claim 8, wherein the crown position determiner comprises a camera situated above the stripper and cutter.

13. The device according to claim 12, wherein the orienting device comprises a vision system with a programmable controller and the camera, the vision system being configured to search for the location and an indication of the center of the crown of the vegetable plant by camera image searching, the vision system with the programmable controller being configured to control a position of the camera in the horizontal plane relative to earth, based on a current camera image.

14. The device according to claim 13, wherein the vision system is configured to provide an indication for a girth of the crown of the vegetable plant, in a projection on a horizontal plane, using contrast measurements, and
wherein the controller is configured to enter a reference girth size of the crowns of the vegetable plants to be harvested, the controller being configured to compare a crown surface indicated by the camera to the reference girth size, and, based on an outcome of the comparing, either activating or not activating one or more of the stripper and the cutter.

15. The device according to claim 1, further comprising:
a lift;
a lift drive configured to move an upper part of the vegetable plant to a higher level when the upper part of the vegetable plant is severed by the cutter, in at least the substantially vertical direction, the cutter forming a support that is part of the lift for a portion of the severed vegetable plant situated above the cutting surface;

a receptacle for the severed upper part of the vegetable plant;

a transfer device configured to transfer the severed upper part of the vegetable plant from the lift to the receptacle, the transfer device forming a guide for the severed upper part of the vegetable plant to the receptacle, the guide including a sloping guidance surface, the second drive being configured to move the cutter to a position cancelling the support, the severed upper part of the vegetable plant being released to fall towards the guide to be guided to the receptacle by the guide, the guide configured to be moved between an inactive position in which the cutter including the support is given vertical free passage, and an active position in which the severed upper part of the vegetable plant is received from the support and is guided to the receptacle; and a fifth drive configured to move the guide between the inactive position and the active position.

16. A method for harvesting vegetable plants from the ground, each of the vegetable plants having a stem, a crown supported by the stem, and leaves attached to the stem, the method comprising:

bringing a stripper into engagement with the stem under the crown in an upper part of the stem;

moving the stripper downwards along the stem while stripping the leaves from the stem; and severing the stem to detach the crown from the ground by a cutter after bringing the stripper into engagement with the stem and moving the stripper downwards along the stem.

17. The method according to claim 16, wherein the stem is severed at a location above the stripper.

18. The method according to claim 16, wherein the stem is severed by a blade of the cutter at an upper part of the respective vegetable plant, which includes the crown, the blade being used as a transporter of a severed upper part of the respective vegetable plant to a location of discharge, the blade, when functioning as the transporter, being moved in a vertical direction, and wherein, in a discharge position, a guide is placed under the blade, the blade being placed in an inactive position to discharge the severed upper part to the guide under the influence of gravity, the guide guiding the severed upper part to a discharge or receptacle under an influence of gravity.

19. The method according to claim 16, further comprising:

obtaining camera images using a camera to search for a location indicative of a center of the crown; and setting a position of the stripper and the cutter relative to the crown in one or more of the X-direction and the Y-direction based on the camera images, by a vision system, and wherein the stripper, the cutter, and the camera are supported by a frame configured to be moved along the vegetable plants to be harvested, and wherein the camera, as a unit with the stripper and the cutter, is moved in the horizontal plane relative to the frame to take the camera substantially above the center of the crown.

20. The method according to claim 16, further comprising using a vision system comprising a camera and a controller to provide an indication of a girth of the crown of the vegetable plant, the controller being configured to determine a crown surface in a projection on a horizontal plane, the controller of the vision system being configured to compare the crown girth indicated by the camera to a pre-entered reference girth size, and based on an outcome of the comparing, either activating or not activating one or more of the stripper and the cutter.

\* \* \* \* \*